(12) United States Patent
Gerszberg

(10) Patent No.: US 8,941,332 B2
(45) Date of Patent: Jan. 27, 2015

(54) SYSTEMS AND APPARATUSES INCLUDING ALTERABLE CHARACTERISTICS AND METHODS OF ALTERING AND COORDINATING SUCH CHARACTERISTICS

(71) Applicant: Eminvent LLC, New York, NY (US)

(72) Inventor: Seth M. Gerszberg, Highland Park, NJ (US)

( * ) Notice: Subject to any disclaimer, the term of this patent is extended or adjusted under 35 U.S.C. 154(b) by 211 days.

(21) Appl. No.: 13/718,046

(22) Filed: Dec. 18, 2012

(65) Prior Publication Data

US 2013/0271809 A1 Oct. 17, 2013

Related U.S. Application Data

(63) Continuation-in-part of application No. 13/661,802, filed on Oct. 26, 2011, now Pat. No. 8,502,480, and a (Continued)

(51) Int. Cl.
*H05B 37/00* (2006.01)
*G02F 1/23* (2006.01)

(Continued)

(52) U.S. Cl.
CPC .............. *G02F 1/23* (2013.01); *H05B 33/0857* (2013.01); *H05B 37/00* (2013.01); *H05B 37/0245* (2013.01); *H05B 37/029* (2013.01)
USPC ........... 315/312; 315/316; 315/318; 315/362; 362/227; 362/231; 362/236; 362/543

(58) Field of Classification Search
CPC .. H05B 37/02; H05B 37/0245; H05B 37/029; H05B 33/0842; H05B 33/0863; G02F 1/23
USPC ................. 315/297, 307, 312, 316, 318, 362; 362/221, 227, 231, 233, 236, 240, 362/249.02, 543, 545, 800
See application file for complete search history.

(56) References Cited

U.S. PATENT DOCUMENTS

| 2,962,580 A | 11/1960 | Jones |
| 4,164,008 A | 8/1979 | Miller et al. |

(Continued)

FOREIGN PATENT DOCUMENTS

| GB | 2408915 | 6/2005 |
| WO | 2013/021209 | 2/2013 |

OTHER PUBLICATIONS www.parts-express.com, Vellman CHLSC1 High Power RGB LED Control Unit w/IR Remote 073-220, 4 pages, published at least as early as Apr. 13, 2012.

(Continued)

*Primary Examiner* — Haiss Philogene

(57) ABSTRACT

Systems, apparatuses, and methods are provided that include alterable characteristics and such alterable characteristics may be coordinated. Such systems, apparatuses, and methods may include wearable apparatuses and such alterable characteristics may relate to illumination conditions or coating colors. In one example, a wearable apparatus includes an output device such as an illumination device or coating that may be manually manipulated between two different conditions. In another example, two wearable apparatuses may each include an output device such as an illumination device or a coating, and operation of the two illumination devices or coatings may be coordinated. In a further example, operation of an apparatus may be controlled by a third party or venue. Still another exemplary system may include a capturing device for capturing a characteristic of an object and controlling an output device of an apparatus to operate with the same characteristic as the captured characteristic.

31 Claims, 12 Drawing Sheets

Related U.S. Application Data continuation-in-part of application No. 13/661,914, filed on Oct. 26, 2012, said application No. 13/661,802 is a continuation of application No. 13/570,316, filed on Aug. 9, 2012, said application No. 13/661,914 is a continuation of application No. 13/570,316, filed on Aug. 9, 2012.

(60) Provisional application No. 61/622,623, filed on Apr. 11, 2012, provisional application No. 61/650,107, filed on May 22, 2012.

(51) Int. Cl.
*H05B 33/08* (2006.01)
*H05B 37/02* (2006.01)

(56) References Cited

U.S. PATENT DOCUMENTS

| | | | |
|---|---|---|---|
| 4,308,572 | A | 12/1981 | Davidson et al. |
| 4,602,191 | A | 7/1986 | Davila |
| D320,019 | S | 9/1991 | Murad |
| 6,016,038 | A | 1/2000 | Mueller et al. |
| 6,150,774 | A | 11/2000 | Mueller et al. |
| 6,499,857 | B1 | 12/2002 | Lumley |
| 6,528,954 | B1 | 3/2003 | Lys et al. |
| 6,617,093 | B2 * | 9/2003 | Pokorny et al. ............ 430/200 |
| 6,806,659 | B1 | 10/2004 | Mueller et al. |
| 7,178,941 | B2 | 2/2007 | Roberge et al. |
| 7,186,003 | B2 | 3/2007 | Dowling et al. |
| 7,329,019 | B2 | 2/2008 | Cheung |
| 7,479,662 | B2 | 1/2009 | Soules |
| 7,520,634 | B2 | 4/2009 | Ducharme et al. |
| 7,659,674 | B2 | 2/2010 | Mueller et al. |
| 7,675,407 | B2 | 3/2010 | Yuk et al. |
| 7,755,481 | B2 | 7/2010 | Gayden |
| D624,247 | S | 9/2010 | Thind |
| 7,821,212 | B2 | 10/2010 | Wray |
| 7,845,823 | B2 * | 12/2010 | Mueller et al. ............ 362/231 |
| 7,936,264 | B2 | 5/2011 | Kates |
| 8,179,252 | B2 | 5/2012 | Harrell |
| 8,204,786 | B2 | 6/2012 | LeBoeuf et al. |
| 8,502,480 | B1 * | 8/2013 | Gerszberg et al. ............ 315/312 |
| 8,669,716 | B2 * | 3/2014 | Recker et al. ............ 315/291 |
| 2003/0011538 | A1 | 1/2003 | Lys et al. |
| 2005/0225976 | A1 | 10/2005 | Zampini |
| 2006/0170376 | A1 | 8/2006 | Piepgras et al. |
| 2009/0051532 | A1 | 2/2009 | Van Der Poel |
| 2009/0059603 | A1 | 3/2009 | Recker et al. |
| 2009/0109660 | A1 | 4/2009 | Dutcher |
| 2009/0122526 | A1 | 5/2009 | Lei |
| 2009/0146583 | A1 | 6/2009 | Bhadri |
| 2009/0191839 | A1 | 7/2009 | Cannon, Jr. |
| 2011/0140913 | A1 | 6/2011 | Montenero |
| 2011/0260652 | A1 | 10/2011 | Hsieh |
| 2012/0001567 | A1 | 1/2012 | Knapp et al. |
| 2012/0019162 | A1 | 1/2012 | Budike, Jr. |
| 2013/0271009 | A1 * | 10/2013 | Gerszberg et al. ............ 315/149 |

OTHER PUBLICATIONS http://www.smartconnectedcomnnunities.org/blogs/energy/2012/04/05/network-based-led-lighting-is-here, Cisco Energy Wise LED Demo by Joulex with Nu LEDs Fixtures, 3 pages, published at least as early as Apr. 5, 2012.

USA Today published Apr. 6, 2012, "Flexible Displays Bend What's Possible", 3 pages.

http://www.tshirtos.com, 13 pages, at least partially published at least as early as Aug. 10, 2012.

http://makeprojects.com/Project/Android-Controlled-LED-Light-Shirt/1586/1#.UG8o8U082Sr; 8 pages, published in accordance with the "Guide History" page of this submission, some of which was published on Nov. 8, 2011.

http://www.youtube.com/watch?v=tqgDemh1AW4, Android controlled RGB-LED TV-Backlight (Ambilight) over Bluetooth, 4 pages, published at least as early as Dec. 10, 2011.

http://www.youtube.com/watch?v=MDGU5qxCdRQ, Android Remote Controlled LED Strip, 4 pages, published at least as early as Nov. 7, 2011.

http://www.jystex.com, Iphone Control/Wifi LED, 14 pages, published at least as early as Aug. 1, 2012.

www.youtube.com/watch?feature=player_embedded&v=DcY8FnuDObA, multiple screenshots of video entitled "Android Controlled Led Light Shirt", 6 pages, video published on www.youtube.com on Oct. 30, 2011.

www.alienware.com; laptops, keyboards, and desktops including a feature called AlienFX comprising zones on the devices that can be illuminated different colors by a user; 3 pages; published at least as early as Apr. 11, 2012.

www.meethue.com; can take a picture, select a portion of the picture including a color, and illuminate a light the same color as the color in the picture; 6 pages; published at least as early as Oct. 29, 2012.

PCT International Search Report and Written Opinion of the International Search Authority for Int'l App. No. PCT/US2013/036071, dated Jul. 29, 2013.

* cited by examiner

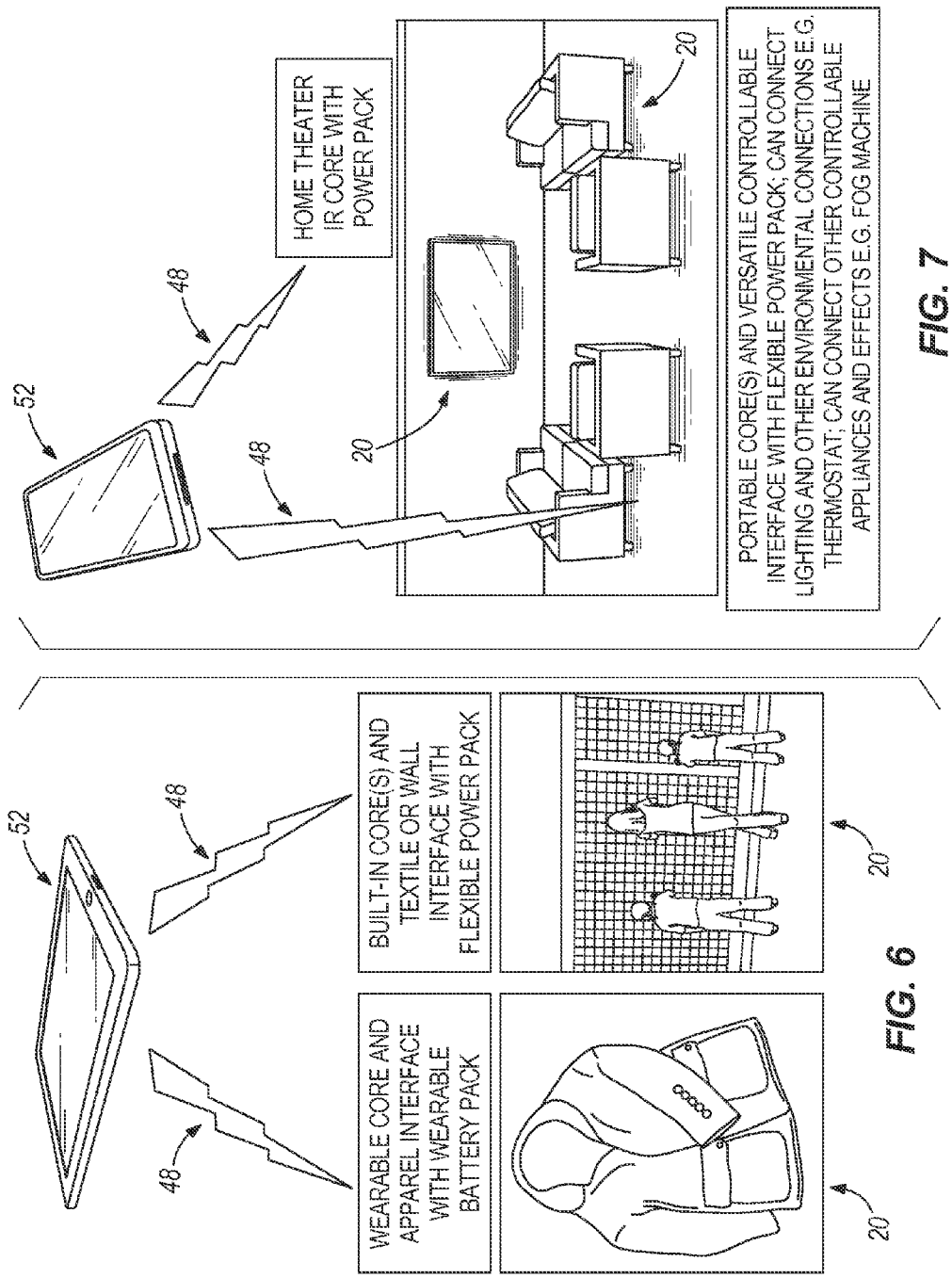

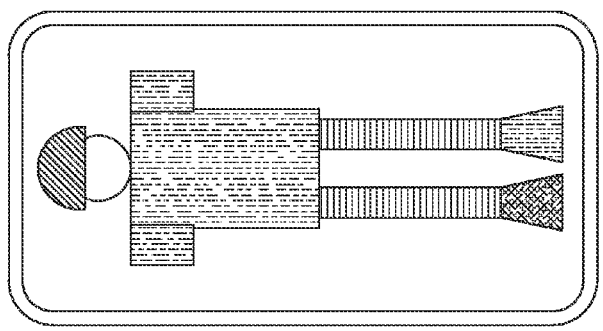
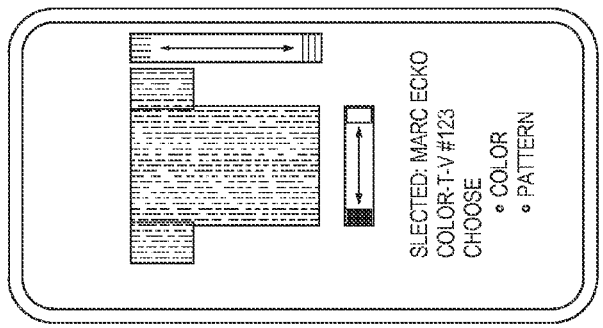
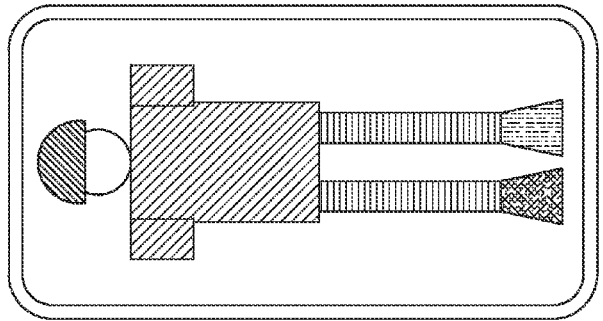
FIG. 15

SYSTEMS AND APPARATUSES INCLUDING ALTERABLE CHARACTERISTICS AND METHODS OF ALTERING AND COORDINATING SUCH CHARACTERISTICS

RELATED APPLICATIONS

The present application is a continuation-in-part of co-pending U.S. patent application Ser. No. 13/661,802, filed Oct. 26, 2012, and Ser. No. 13/661,914, filed Oct. 26, 2012, both of which are continuations of U.S. patent application Ser. No. 13/570,316, filed Aug. 9, 2012, which claims the benefit of co-pending U.S. Provisional Patent Application Nos. 61/622,623, filed Apr. 11, 2012, and 61/650,107, filed May 22, 2012, the contents of all of which are incorporated herein by reference.

FIELD OF THE INVENTION

The present invention generally relates to systems and apparatuses including characteristics that may be altered by a user with methods and, more particularly, to systems and apparatuses including characteristics that may be altered and/or coordinated with one another by a user with methods.

SUMMARY

In one example, a product is provided and operation of the product may be altered by a user.

In another example, a method of altering operation of a product by a user is provided.

In a further example, a plurality of products are provided and operation of the products may be altered by a user.

In yet another example, a method of altering operation of a plurality of products is provided.

In yet a further example, a plurality of products are provided and operation of the products may be coordinated by a user.

In still another example, a method of coordinating operation of a plurality of products is provided.

In still a further example, an apparatus is provided and includes an input device including a first input condition and a second input condition, a power source, an illumination device including a first illumination condition when the input device is in the first input condition and a second illumination condition when the input device is in the second input condition, wherein the first illumination condition is different than the second illumination condition, and wherein the input device is manually manipulatable to change the input device between the first input condition and the second input condition in order to respectively change the illumination device between the first illumination condition and the second illumination condition.

In another example, an apparatus is provided and includes a receiver, a power source, an illumination device including a first illumination condition and a second illumination condition different than the first illumination condition, and a processor in communication with the receiver and the illumination device, wherein the receiver is adapted to receive a signal containing data for determining operability of the illumination device, and wherein the processor illuminates the illumination device in one of the first illumination condition and the second illumination condition based on the signal received by the receiver.

In a further example, a system is provided and includes a first apparatus including a first receiver, a first power source, a first illumination device, and a first processor in communication with the first receiver and the first illumination device. The system also including a second apparatus including a second receiver, a second power source, a second illumination device, and a second processor in communication with the second receiver and the second illumination device. Additionally, the system includes a communication device including a processor and a transmitter, wherein the communication device is adapted to communicate with the first apparatus and the second apparatus to control the first illumination device and the second illumination device in a coordinated manner.

In yet another example, a system is provided an includes an apparatus including a receiver, a power source, a first illumination device, a second illumination device, and a processor in communication with the receiver, the first illumination device, and the second illumination device. The system also includes a communication device including a processor and a transmitter, wherein the communication device is adapted to communicate with the apparatus to control the first and second illumination devices in a coordinated manner.

In yet a further example, a system is provided and includes an apparatus including a receiver, a power source, an output device, and a processor in communication with the receiver and the output device. The system also including a venue communication device including a processor and a transmitter and adapted to communicate with the apparatus to control the output device, wherein the venue communication device has a limited range of communication associated with a venue and communicates with the apparatus to control the output device when the apparatus is within the limited range of communication.

In still another example, a system is provided and includes an apparatus including a receiver, a power source, an output device, and a processor in communication with the receiver and the output device. The system also including a first communication device including a processor, memory, and a transmitter, wherein the first communication device is adapted to communicate with the apparatus to control the output device, and wherein the first communication device stores data associated with control of the output device in the memory of the first communication device. Additionally, the system includes a second communication device including a processor, memory, and a transmitter, wherein the second communication device is adapted to communicate with the apparatus to control the output device, and wherein the second communication device is adapted to communicate with the first communication device to copy the data associated with the control of the output device from the first communication device and store the copied data in the memory of the second communication device, and wherein the second communication device relies on the stored data to control the output device in the same manner as the first communication device controls the output device.

In still a further example, a system is provided and includes an object including a characteristic. The system also includes a communication device including a power source, a transmitter, a capturing device, and a processor in communication with the transmitter and the capturing device, wherein the capturing device is adapted to capture the characteristic of the object and transmit data associated with the captured characteristic. Additionally, the system includes an apparatus including a receiver, a power source, an output device, and a processor in communication with the receiver and the output device, wherein the receiver receives the data transmitted by the communication device and the processor operates the output device with a characteristic the same as the captured characteristic of the object.

In another example, an apparatus is provided and includes an input device manually manipulatable to change the input device between a first input condition and a second input condition, and a coating adapted to be a first color with the input device in the first input condition and a second color with the input device in the second input condition. The first color is different than the second color. The apparatus also includes a power source adapted to supply a first level of current to the coating with the input device in the first input condition and a second level of current to the coating with the input device in the second input condition. The first level of current is different than the second level of current.

In a further example, an apparatus is provided and includes a receiver, a coating adapted to change between a first color and a second color different than the first color, and a power source adapted to supply the coating with a first level of current and a second level of current. The coating has the first color when supplied with the first level of current and has the second color when supplied with the second level of current. The apparatus also including a processor in communication with the receiver, the power source, and the coating. The receiver is adapted to receive a signal and communicate the signal to the processor, and the processor is configured to have the power source supply the coating with one of the first level of current and the second level of current based on the signal received by the receiver.

In still another example, a system is provided and includes a first apparatus, a second apparatus, and a communication device. The first apparatus includes a first receiver, a first power source, a first coating adapted to change color based on a level of current supplied to the first coating from the first power source, and a first processor in communication with the first receiver, the first power source, and the first coating. The second apparatus includes a second receiver, a second power source, a second coating adapted to change color based on a level of current supplied to the second coating from the second power source, and a second processor in communication with the second receiver, the second power source, and the second coating. The communication device includes a processor and a transmitter, and the communication device is adapted to communicate with the first apparatus and the second apparatus to control the first coating and the second coating in a coordinated manner.

In still a further example, a system is provided and includes an apparatus and a venue communication device. The apparatus includes a receiver, a power source, a coating adapted to change color based on a level of current applied to the coating by the power source, and a processor in communication with the receiver, the power source, and the coating. The venue communication device includes a processor and a transmitter and is adapted to communicate with the apparatus to change a color of the coating. The venue communication device has a limited range of communication associated with a venue and communicates with the apparatus to change the color of the coating with the apparatus within the limited range of communication.

In yet another example, a system is provided and includes a communication device and an apparatus. The communication device includes a power source, a transmitter, a capturing device, and a processor in communication with the transmitter, the power source, and the capturing device. The capturing device is adapted to capture a color of an object and transmit data associated with the captured color. The apparatus includes a receiver, an apparatus power source, a coating adapted to change color based on a level of current supplied by the apparatus power source, and a processor in communication with the receiver, the apparatus power source, and the coating. The receiver is configured to receive the data transmitted by the communication device and the processor is configured to have the apparatus supply a level of current to the coating such that the coating is the same color as the captured color associated with the object.

BRIEF DESCRIPTION OF THE DRAWINGS

FIG. 6 is a diagram of a further exemplary system;
FIG. 7 is a diagram of still another exemplary system;
FIG. 15 is yet another exemplary system of the present invention.

Figure 1:
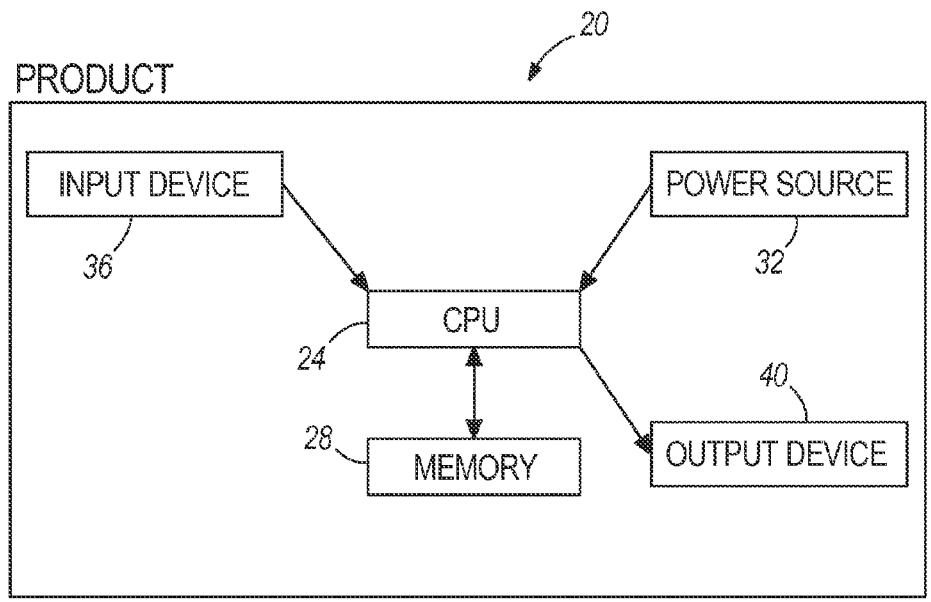
FIG. 1 is a diagram of an exemplary product.

Before any independent features and embodiments of the invention are explained in detail, it is to be understood that the invention is not limited in its application to the details of the construction and the arrangement of the components set forth in the following description or illustrated in the drawings. The invention is capable of other embodiments and of being practiced or of being carried out in various ways. Also, it is understood that the phraseology and terminology used herein is for the purpose of description and should not be regarded as limiting.

DETAILED DESCRIPTION

With the advancement of electronics, users of the electronics are becoming more savvy and have more of a desire to participate in product development, product manipulation, and product performance. Additionally, a wide variety of products that may be purchased by users have limited capabilities, thereby limiting their attractiveness to a small group of consumers. The present invention provides, among other things, users of electronic devices and products with the capability to affect product development, product manipulation, and product performance, and further provides a wide variety of products with capabilities not previously contemplated facilitating development, manipulation, and performance control of products by users. Moreover, advancement of electronic technologies allows new manners of controlling operation of the electronics.

Many types of apparatuses or products 20 exist. Some of these products 20 are electronics, while other products 20 are not typically electrical in nature, but have electronics incorporated therein for the present invention. In some exemplary embodiments of the present invention, a wide variety of products 20, both those typically characterized as electronic in nature and those not previously characterized as electronic in nature, include a central processing unit (CPU) 24, memory 28, an onboard power source 32, an input device 36 and an output device 40 (see FIG. 1). The following examples of products 20 are provided for exemplary purposes and are not intended to be limiting upon the present invention. Rather, the present invention is capable of including any product 20 and all of such possibilities are intended to be within the spirit and scope of the present invention. For example, products 20 may include: footwear (e.g., sneakers, rollerblades, ice skates, flip-flops, sandals, etc.); headwear (e.g., caps, hats, headbands, etc.); apparel (e.g., shirts, pants, jackets, shorts, bodysuits; etc.); jewelry (e.g., watches, wristlets, earrings, necklaces, broaches, pins, etc.); other wearable items (e.g., wristbands, armbands, handkerchiefs, do-rags, etc.); accessories (e.g., eye glasses, sun glasses, bags, handbags, luggage, backpacks, briefcases, belts, suspenders/braces, glow sticks, holiday lights, etc.); furniture (e.g., sofa, chair, table, entertainment system, desk, etc.); automobiles (e.g., cars, trucks, motorcycles, mopeds, motorbikes, all-terrain vehicles (ATV); etc.); unicycles; bicycles; tricycles; consumer electronics (e.g., telephones, wireless communication devices, cellular phones, iPhones®, Blackberrys®, other smartphones, iPad®, other tablets, handheld and stationary video game consoles, personal computers, laptops, headphones, video displays, projectors, audio or sound systems, speakers, scent generators, environmental control systems, electric fans, liquid misting machines, smoke or fog generators, etc.); structural and building materials (e.g., floor tiles, materials for facades of buildings, walls, door frames, doors, etc.); appliances (e.g., refrigerator/freezer, stove, oven, blender, microwave, etc.); license plate frames; tire rims; picture frames; etc. As one will ascertain upon reading and understanding the present invention, the applications and products to which the present invention applies is quite vast, thus making it difficult to identify every possible application and product herein. Therefore, it should be understood that the present invention applies to every appropriate application and product known to date and those appropriate applications and products yet to exist.

The CPU 24 is capable of performing the necessary functions to carryout desired operability of the product 20 and communicates with the memory 28 as needed. An onboard power source 32 provides the product 20 with the necessary power and, particularly, the CPU 24 with necessary power to perform the desired operability of the product 20. The CPU 24 may be any appropriate type of CPU in order to perform the desired operability of the product 20. The memory 28 may be RAM, ROM, a combination thereof or any other type of memory in order to facilitate desired operation of the product 20. The onboard power source 32 may be any type of power source such as, for example, any type of battery, solar power cell, fuel cell, other AC or DC power sources, or any other type of power source that provides the necessary power for operation of the product 20.

A user may manipulate the input device 36 of the product 20 to affect operation of the output device 40. The input device 36 is capable of being a wide variety of input devices and the output device 40 is capable of being a wide variety of output devices. In the illustrated exemplary embodiment, the product 20 includes a single input device 36 and a single output device 40, however, it should be understood that the product 20 is capable of including any number of input devices 36 and output devices 40 and be within the intended spirit and scope of the present invention. The following examples of input devices 36 and output devices 40 are provided for exemplary purposes and are not intended to be limiting. Rather, the present invention is capable of having any input device and any output device and all of such possibilities are intended to be within the spirit and scope of the present invention. For example, the input device 36 may be: a mechanical actuator (e.g., rotatable knob, sliding knob, sliding switch, flip switch, etc.); keyboard; mouse; touch screen; sensor; etc. Also, for example, the output device 40 may be: an illumination device (e.g., light emitting diode (LED), organic LED (OLED), printed electronics with illumination devices, embedded electronics with illumination devices, electroluminescent devices, quantum dots, etc.); a speaker; a vibration generating device; an environmental control system; a video display or monitor; a coating that alters its characteristics when exposed external conditions (e.g., thermochromic coatings, photochromic coatings, electrochromic coatings, paramagnetic paint, etc.); etc.

The input device 36 provides a user with the ability to initiate operation and/or adjust operation of the output device 40. In some examples, the product 20 may be provided from a factory with an initial operation and the user is capable of adjusting the product 20 via the input device 36 to a second operation different than the initial operation. The user is also capable of adjusting the operation of the product 20 between any number of different operations and an unlimited amount of times. The following are exemplary products 20 and exemplary processes of adjusting the operation of the exemplary products 20. Neither the exemplary products 20 nor the exemplary adjusting processes are intended to be limiting. Rather, any product and any process of adjusting may be utilized and be within the intended spirit and scope of the present invention.

In some exemplary embodiments, the product 20 may be a shirt including a mechanical keypad as the input device 36, a CPU 24, memory 28, a power source 32, and an illumination device as the output device 40. A user may perform a first keystroke or a first series of keystrokes on the keypad 36 to establish a first operation of the illumination device 40. The first operation of the illumination device 40 may include illuminating the illumination device 40 a first color, pulsating the illumination device 40 at a first rate, etc. A user may then perform a second keystroke or a second series of keystrokes on the keypad 36 to adjust operation of the product 20 from the first operation to a second operation different than the first operation. Adjusting from the first operation to the second operation of the illumination device 40 may include changing the color of the illumination device 40, changing the pulsating rate of the illumination device 40, changing both color and pulsating rate of the illumination device 40, changing the intensity of the illumination, or changing any other characteristic of the illumination device 40. This exemplary embodiment describes a single illumination device 40. However, the product 20 is capable of including a plurality of illumination devices 40 and the input device 36 may be manipulated to change operation of the plurality of illumination devices 40. Such changes in operation of the plurality of illumination devices 40 includes those changes described above in connection with a single illumination device 40 and additionally may include changing the pattern of flashing/pulsating of the illumination devices 40, changing direction of the flashing/pulsating of the illumination devices 40, changing the intensity of the illumination, or changing any other characteristics of the plurality of illumination devices 40.

In other exemplary embodiments, the product 20 may include a mechanical actuator as the input device 36, a CPU 24, memory 28, an onboard power source 32, and a speaker as the output device 40. The mechanical actuator 36 may have any number of positions and a user may move the actuator 36 from a first position, wherein the speaker 40 may output first audio, to a second position, wherein the speaker 40 may output second audio different than the first audio. The speaker 40 may also output no audio when the actuator 36 is in either the first position or the second position.

In further exemplary embodiments, the product 20 may include a mechanical actuator as an input device 36, a CPU 24, memory 28, an onboard power source 32, and a vibration device as the output device 40. The mechanical actuator 36 may have any number of positions and a user may move the actuator 36 from a first position, wherein the vibration device 40 may vibrate at a first rate, to a second position, wherein the vibration device 40 may vibrate at a second rate different than the first rate. The vibration device 40 may also output no vibration when the actuator 36 is in either the first position or the second position.

In still other exemplary embodiments, the product 20 may be a shirt including a mechanical keypad as the input device 36, a CPU 24, memory 28, a power source 32, and the output device 40 may be a coating applied to the shirt 20 that alters its characteristics based on external conditions. Exemplary coatings include, but are not limited to: thermochromic coatings that change color when exposed to different temperatures; photochromic coatings that change color when exposed to different levels of ultraviolet light; electrochromic coatings that change color based on a level of electrical current applied to the coatings; etc. With respect to electrochomic coatings, such coatings may include paramagnetic iron oxide and application of electrical current to the coating adjusts spacing of the paramagnetic crystals or particles, thereby modifying the color and reflective properties of the coating. A user may perform a first keystroke or a first series of keystrokes on the keypad 36 to establish a first operation of the coating 40. The first operation of the coating 40 may include applying a first level of electrical current to the coating 40 to provide the coating with a first color. A user may then perform a second keystroke or a second series of keystrokes on the keypad 36 to adjust operation of the product 20 from the first operation to a second operation different than the first operation. Adjusting from the first operation to the second operation of the coating 40 may include applying a second level of electrical current to the coating 40 to change the color of the coating 40 to a second color different than the first color. This exemplary embodiment describes a single coating 40. However, the product 20 is capable of including a plurality of coatings 40 and the input device 36 may be manipulated to change operation of the plurality of coatings 40. Such changes in operation of the plurality of coatings 40 includes those changes described above in connection with a single coating 40 and additionally may include changing the pattern of colors of the coatings 40, or changing any other characteristics of the plurality of coatings 40.

Figure 2:
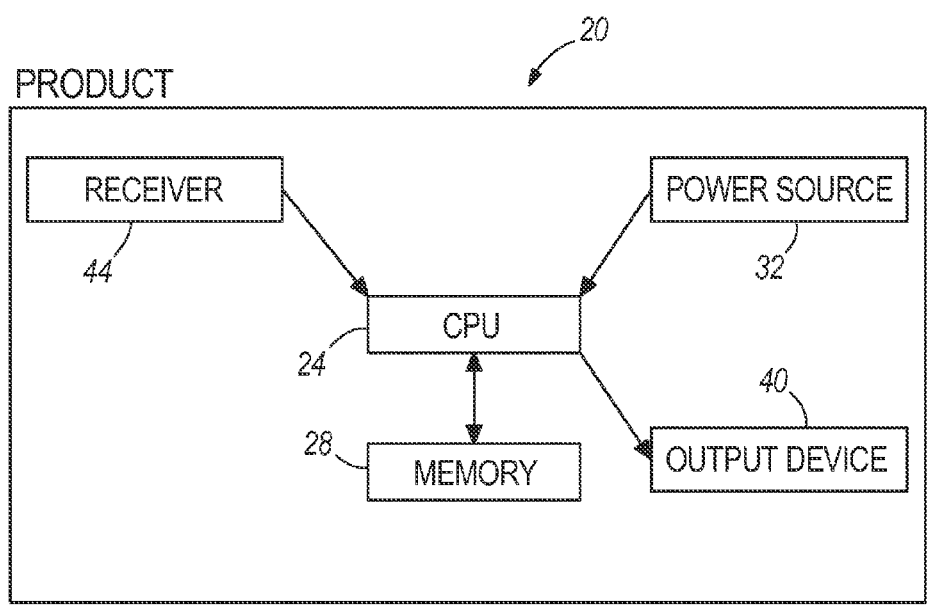
FIG. 2 is a diagram of another exemplary product.

With reference to FIG. 2, another exemplary product 20 is illustrated. This exemplary product 20 may be any of the types of products 20 identified above, alternative products, and other products not listed. Moreover, the product 20 illustrated in FIG. 2 may have similar components to the product 20 illustrated in FIG. 1 and those similar components in the product 20 illustrated in FIG. 2 may have the same features, characteristics, alternatives, etc., as the product 20 illustrated in FIG. 1 and described above. An exemplary difference between the products 20 illustrated in FIGS. 1 and 2 is that the product 20 in FIG. 2 includes a receiver 44 rather than an input device 36. It should be understood that the product illustrated in FIG. 2 may include both an input device and a receiver (see for example FIG. 3). The receiver 44 is adapted to receive a signal 48 or signals 48 from a wireless communication source or device 52. The signal 48 may be in any form such as, for example, Bluetooth, wireless TCP/IP, cellular, Wi-Fi, etc., and the communication source 52 may be any type of communication source 52 such as, for example, a cellular phone, smartphone, tablet, personal computer, laptop, sensor, an interactive entertainment device (e.g., GoogleTV, any other smart television or television with interactive capabilities, and any other smart or interactive device compatible with a television), etc. The signal 48 includes data with instructions on how to operate the output device 40. The CPU 24 processes the data and controls operation of the output device 40. The output device 40 of the product 20 illustrated in FIG. 2 is capable of being any of the types of output devices 40 described above in connection with FIG. 1, any alternatives of the output devices 40 described above, or any other output devices not described herein but within the intended spirit and scope of the present invention. In the illustrated exemplary embodiment, the product 20 includes a single receiver 44 and a single output device 40, however, it should be understood that the product 20 is capable of including any number of receivers 44 and any number of output devices 40 and be within the intended spirit and scope of the present invention.

Communication with the product 20 via the receiver 44 provides a user with the ability to adjust operation of the output device 40. In some examples, a product 20 may be provided from a factory with an initial operation and the user is capable of adjusting the product 20 to a second operation different than the initial operation via sending communications to the receiver 44. The user is also capable of adjusting the operation of the product 20 between any number of different operations and may make such adjustments an unlimited amount of times. The following are exemplary products 20 and exemplary processes of adjusting the operation of the exemplary products 20. Neither the exemplary products 20 nor the exemplary adjusting processes are intended to be limiting. Rather, any product and any process of adjusting may be utilized and be within the intended spirit and scope of the present invention.

In some exemplary embodiments, the product 20 may be a shirt including a receiver 44, a CPU 24, memory 28, an onboard power source 32, and an illumination device as the output device 40. A user may send a signal 48 to the shirt 20 from a communication device 52. The receiver 44 on the shirt 20 will receive the signal 48, and the CPU 24 will process the signal 48 and the data included therein. The CPU 24 will then control the illumination device 40 in a first operation. The first operation of the illumination device 40 may include illuminating the illumination device 40 a first color, pulsating the illumination device 40 at a first rate, etc. A user may then send a second signal 48 to the shirt 20 from the communication device 52. The receiver 44 on the shirt 20 receives the second signal 48 and the CPU 24 processes the second signal 48 and the data included therein. The CPU 24 then controls the illumination device 40 in a second operation different than the first operation. Adjusting from the first operation to the second operation of the illumination device 40 may include changing the color of the illumination device 40, changing the pulsating rate of the illumination device 40, changing both color and pulsating rate of the illumination device 40, changing the intensity of illumination, or changing any other characteristic of the illumination device 40. This exemplary embodiment describes a single illumination device 40. However, the product 20 is capable of including a plurality of illumination devices 40 and the user may send signals 48 to the receiver 44 of the product 20 to change operation of the plurality of illumination devices 40. Such changes in operation of the plurality of illumination devices 40 may include those changes described above in connection with a single illumination device 40 and additionally may include changing the pattern of flashing/pulsating of the illumination devices 40, changing direction of the flashing/pulsating of the illumination devices 40, changing the intensity of illumination of the illumination devices 40, or changing any other characteristics of the plurality of illumination devices 40.

In some exemplary embodiments, the product 20 may be a body suit including a receiver 44, a CPU 24, memory 28, an onboard power source 32, and a plurality of illumination devices as the output devices 40. Some of the illumination devices may be supported on an upper body portion of the body suit 20 while other illumination devices may be supported on a lower body portion of the body suit 20. A user may send a signal 48 to the body suit 20 from a communication device 52. The receiver 44 on the body suit 20 will receive the signal 48, and the CPU 24 will process the signal 48 and the data included therein. The CPU 24 will then control the illumination devices 40 in a first operation. The first operation of the illumination devices 40 may include illuminating the illumination devices 40 on the upper body portion the same as the illumination devices 40 on the lower body portion, illuminating the illumination devices 40 differently on the upper body portion and the lower body portion, etc. For example, illumination devices 40 on an arm portion of the body suit 20 may flash one color and at one rate and illumination devices 40 on a leg portion of the body suit 20 may flash a different color and at a different rate. A user may then send a second signal 48 to the body suit 20 from the communication device 52. The receiver 44 on the body suit 20 receives the second signal 48 and the CPU 24 processes the second signal 48 and the data included therein. The CPU 24 then controls the illumination devices 40 in a second operation different than the first operation. Adjusting from the first operation to the second operation of the illumination devices 40 may include changing the color of the illumination devices 40, changing the flashing/pulsating rate of the illumination devices 40, changing both color and pulsating rate of the illumination devices 40, changing direction of the flashing/pulsating of the illumination devices 40, changing the intensity of illumination, or changing any other characteristic of the illumination devices 40.

In other exemplary embodiments and with reference to FIG. 15, the product may include a variety of different apparel items. In the illustrated exemplary embodiment, the apparel items include a hat, a shirt, and shoes. A user may alter the mood or effect of the apparel through a user input device on the apparel as illustrated and described in FIG. 15.

In further exemplary embodiments, the product 20 may include a receiver 44, a CPU 24, memory 28, an onboard power source 32, and a speaker as the output device 40. A user may send any number of signals 48 from a communication device 52 to the receiver 44 and the CPU 24 will process the signals 48 and the data included therein. The CPU 24 will then operate the speaker 40 in accordance with the signals 48 and data to produce any number of different audios.

In still other exemplary embodiments, the product 20 may include a receiver 44, a CPU 24, memory 28, an onboard power source 32, and a vibration device as the output device 40. A user may send any number of signals 48 from a communication device 52 to the receiver 44 and the CPU 24 will process the signals 48 and the data included therein. The CPU 24 will then operate the vibration device 40 in accordance with the signals 48 and data to produce any number of different vibrations.

In still further exemplary embodiments, the product 20 may be a wearable item including a receiver 44, a CPU 24, memory 28, an onboard power source 32, and an output device 40 comprised of a coating applied to the wearable item 20 that alters its characteristics when exposed to external conditions. A user may send a signal 48 to the wearable item 20 from a communication device 52. The receiver 44 on the wearable item 20 will receive the signal 48, and the CPU 24 will process the signal 48 and the data included therein. The CPU 24 will then control the coating 40 in a first operation. The first operation of the coating 40 may include applying a first level of electrical current to the coating 40 to provide the coating with a first color. A user may then send a second signal 48 to the wearable item 20 from the communication device 52. The receiver 44 on the wearable item 20 receives the second signal 48 and the CPU 24 processes the second signal 48 and the data included therein. The CPU 24 then controls the coating 40 in a second operation different than the first operation. Adjusting from the first operation to the second operation of the coating 40 may include applying a second level of current to the coating to change the color of the coating 40 from the first color to a second color different than the first color. This exemplary embodiment describes a single coating 40. However, the product 20 is capable of including a plurality of coatings 40 and the user may send signals 48 to the receiver 44 of the product 20 to change operation of the plurality of coatings 40. Such changes in operation of the plurality of coatings 40 may include those changes described above in connection with a single coating 40 and additionally may include changing the pattern of the coatings 40, or changing any other characteristics of the plurality of coatings 40.

It should be understood that the products disclosed herein may include any combination of different types of output devices. For example, a product may include both illumination devices and speakers, or illumination devices, speakers, and vibration devices, or illumination devices and coatings, or any other combination of output devices disclosed herein, alternatives thereof, or other output devices not disclosed herein.

Figure 3:
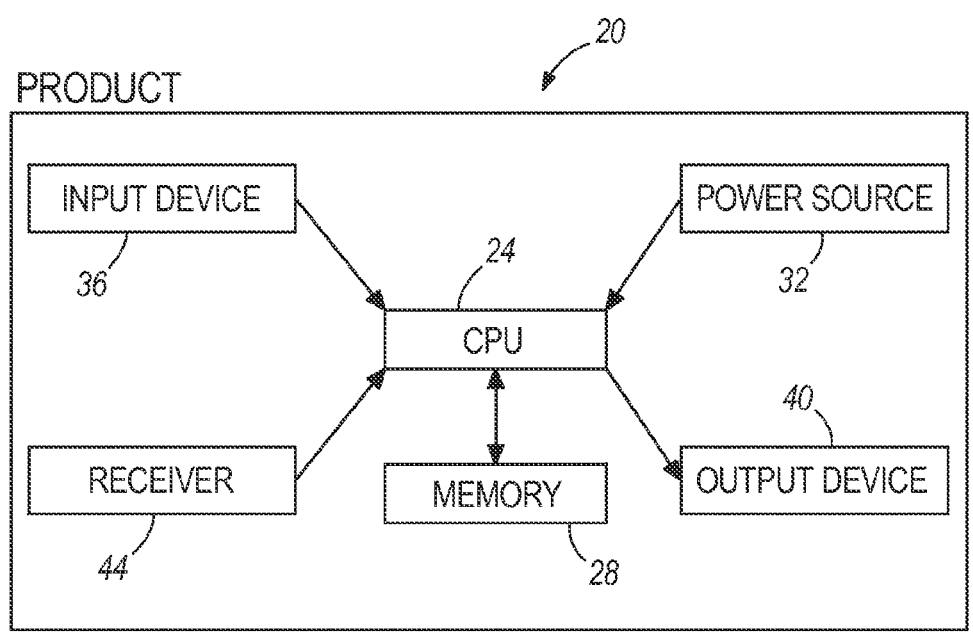
FIG. 3 is a diagram of a further exemplary product.

Referring now to FIG. 3, a further exemplary product 20 is illustrated. This exemplary product 20 may be any of the types of products 20 identified above, alternative products, and other products not listed. Moreover, the product 20 illustrated in FIG. 3 has similar components to the products 20 illustrated in FIGS. 1 and 2, and those similar components in the product 20 illustrated in FIG. 3 may have the same features, characteristics, alternatives, etc., as the products 20 described above and illustrated in FIGS. 1 and 2. One difference between the product 20 illustrated in FIG. 3 and the products 20 illustrated in FIGS. 1 and 2 is that the product 20 in FIG. 3 includes both an input device 36 and a receiver 44 rather than just one of an input device 36 or a receiver 44. The product 20 illustrated in FIG. 3 is capable of being manipulated manually via the input device 36 and is adapted to receive a signal 48 or signals 48 from a wireless communication source 52 via the receiver 44. Thus, a user may adjust operability of the product 20 illustrated in FIG. 3 in more than one manner. The input device 36, the receiver 44, and the output device 40 of the product 20 illustrated in FIG. 3 are capable of being any of the types of input devices 36, receivers 44, and output devices 40 described above, any alternatives thereof, or any other input devices, receivers, and output devices not described herein but within the intended spirit and scope of the present invention. In the illustrated exemplary embodiment, the product 20 includes a single input device 36, a single receiver 44, and a single output device 40, however, it should be understood that the product 20 is capable of including any number of input devices 36, receivers 44, and output devices 40, and be within the intended spirit and scope of the present invention.

The input device 36 and communication with the product 20 via the receiver 44 provide a user with the ability to adjust operation of the output device 40 in multiple manners. In some examples, the product 20 may be provided from a factory with an initial operation and the user is capable of adjusting the product 20 to a second operation different than the initial operation either by adjusting the input device 36 or via sending communications to the receiver 44. The user is also capable of adjusting the operation of the product 20 between any number of different operations and making such adjustments an unlimited amount of times.

Figure 4:
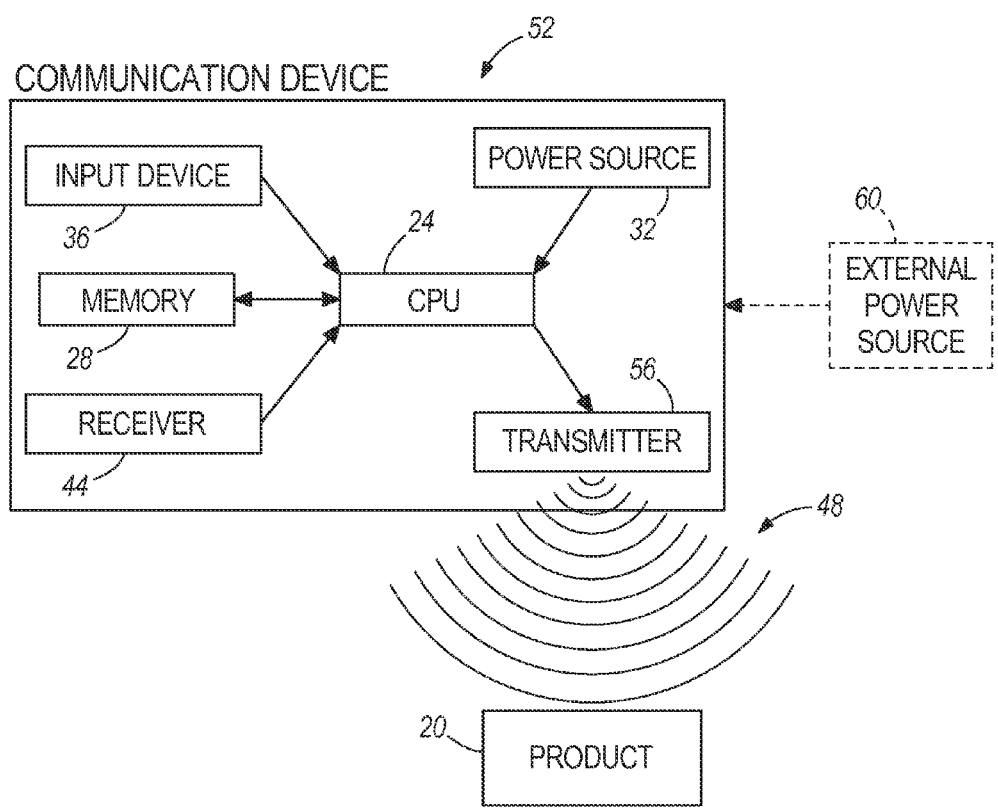
FIG. 4 is a diagram of an exemplary system, the system including an exemplary communication device and one of the exemplary products illustrated in FIGS. 2 and 3.

With reference to FIG. 4, an exemplary system is illustrated and includes an exemplary communication device 52 and an exemplary product 20. The system provides a user with the ability to adjust or alter operation of a product 20 and, more particularly, adjust or alter an output of the product 20. In this exemplary embodiment, the product 20 may be similar to the products 20 illustrated in FIGS. 2 and 3. Alternatively, the product 20 illustrated in FIG. 4 may be different than those products 20 illustrated in FIGS. 2 and 3 as long as the product 20 includes a receiver 44 for receiving signals 48 from a communication device 52. The communication device 52 may be any type of communication device 52 such as, for example, a cellular phone, a smartphone, a tablet, a personal computer, a laptop computer, etc., and may include an input device 36, a receiver 44, a CPU 24, memory 28, a power source 32, and a transmitter 56. The input device 36 may be any of the types of input devices 36 described above in connection with the product 20 illustrated in FIG. 1, alternatives thereof, or other input devices not described herein but within the intended spirit and scope of the present invention.

A user may manipulate the input device 36 of the communication device 52 or may facilitate a signal 48 being sent to the communication device 52 for receipt by the receiver 44 in order to initiate a process for adjusting or altering operation of the product 20. The CPU 24 communicates with either or both of the input device 36 and the receiver 44 to receive the proper signal 48 and instructions. The CPU 24 communicates with the memory 28 as needed to achieve the desired operation of the system and receives the necessary power from the power source 32. The system may additionally include an external power source such as, for example, an alternating current (AC) power source (e.g., a power cord coupled to an electrical wall outlet) if such a power source 60 is needed or when such a power source 60 is available. The CPU 24 communicates with the transmitter 56, which in turn transmits a signal 48 including the desired manner of operating the product 20. The product 20 receives the signal 48 and processes the signal 48 in manners similar to those described above in connection with the products 20 shown in FIGS. 2 and 3. A user may alter or adjust the operation of the product 20 between any number of different operations and may make such adjustments as many times as desired via the communication device 52.

Figure 5:
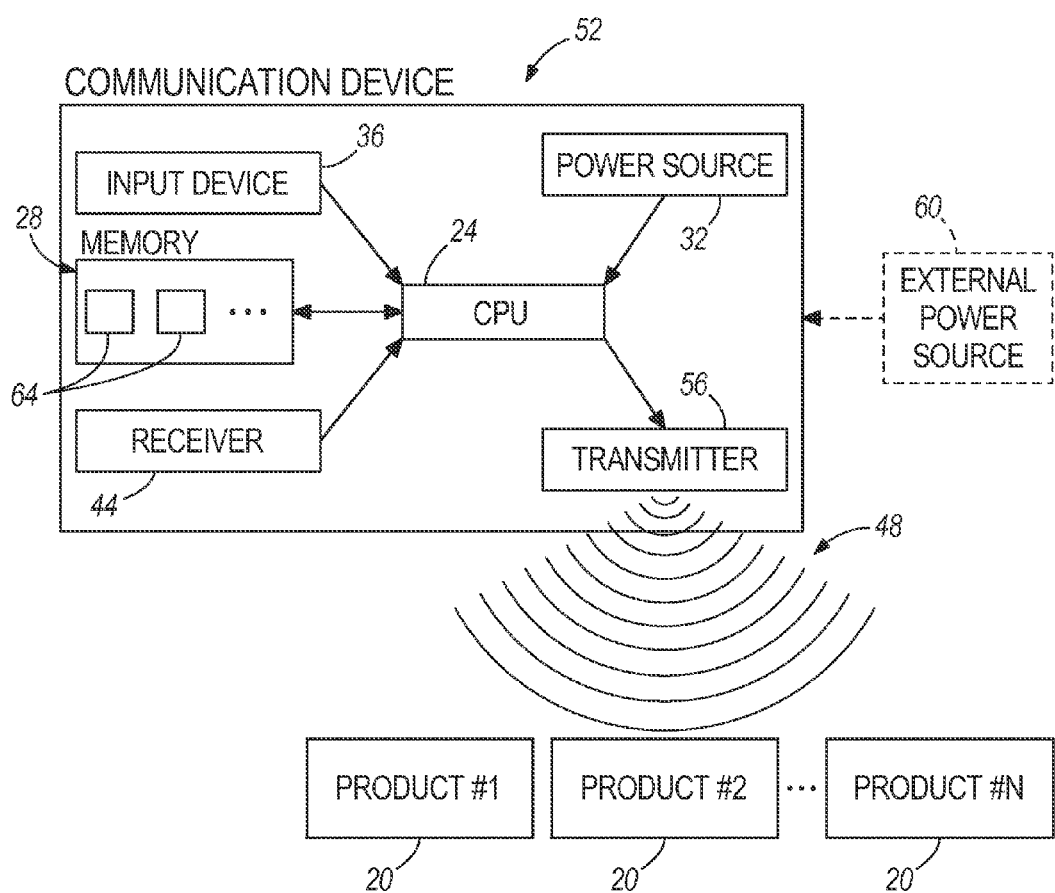
FIG. 5 is a diagram of another exemplary system, the system including an exemplary communication device and a plurality of exemplary products comprised of, in any combination, one or more of the exemplary products shown in FIGS. 2 and 3.

Referring now to FIG. 5, another exemplary system of the present invention is illustrated and includes an exemplary communication device 52 and a plurality of exemplary products 20. The system provides a user with the ability to adjust or alter operation of a plurality of products 20 and, more particularly, adjust or alter outputs of the products 20. Moreover, the system provides a user with the ability to coordinate operation of a plurality of products 20 with respect to one another. In this exemplary embodiment, the products 20 may be similar to the products 20 illustrated in FIGS. 2 and 3. Alternatively, the products 20 illustrated in FIG. 5 may be different than those products 20 illustrated in FIGS. 2 and 3 as long as the products 20 include a receiver 44 for receiving signals 48 from a communication device 52. Also, in this exemplary embodiment, the communication device 52 may be similar to the communication device 52 illustrated in FIG. 4. Alternatively, the communication device 52 in FIG. 5 may be different than the communication device 52 illustrated in FIG. 4 as long as the communication device 52 includes a transmitter 56 and may be manipulated by a user to emit instructions to products 20 via the transmitter 56.

A user may manipulate the input device 36 of the communication device 52 or may facilitate a signal 48 being sent to the communication device 52 for receipt by the receiver 44 in order to initiate a process for adjusting or altering operation of the products 20. The CPU 24 communicates with either or both of the input device 36 and the receiver 44 to receive the proper instructions. The CPU 24 communicates with the memory 28 as needed to achieve the desired operation of the system and receives the necessary power from the power source 32. The system may additionally include an external power source 60 such as, for example, an alternating current (AC) power source (e.g., a power cord coupled to an electrical wall outlet) if such a power source 60 is needed or when such a power source 60 is available. The CPU 24 communicates with the transmitter 56, which in turn transmits a signal 48 or a plurality of signals 48 including all the operating instructions for all the products 20. The products 20 receive their instructions from the signal or plurality of signals 48 and process the signal(s) 48. A user may alter or adjust the operation of the products 20 between any number of different operations and may make such adjustments as many times as desired via the communication device 52.

In some exemplary embodiments, a user may utilize the communication device 52 to control and adjust the products 20 individually and in an unrelated manner. That is, operation of the products 20 will not be coordinated or choreographed.

In other exemplary embodiments, a user may utilize the communication device 52 to control and adjust the products 20 in a coordinated and choreographed manner. Operation of any number of products 20 may be coordinated or choreographed. Additionally, operation of the products 20 may be coordinated or choreographed in any manner. The following are exemplary systems, products and exemplary processes of adjusting and/or coordinating operation of a plurality of exemplary products. None of the exemplary systems, products or adjusting/coordinating processes are intended to be limiting. Rather, any systems, products and processes of adjusting/coordinating may be utilized and be within the intended spirit and scope of the present invention.

In one example and with reference to FIG. 6, an exemplary system may include a tablet as the communication device 52, a jacket as the first product 20, and a wall interface or wall structure as the second product 20. The tablet 52 may include similar components as the communication device 52 illustrated in FIG. 5. The tablet 52 may also include a downloadable software program or application ("APP") stored thereon in the memory 28 that facilitates adjustment and coordination of the operation of the first and second products 20. The wall structure 20 may be similar to one of the products 20 illustrated in FIGS. 2 and 3 with the wall structure 20 including a receiver 44 to communicate with the communication device 52 and an illumination device as the output device 40. The tablet 52 may include a touch screen as the input device 36 and a user may initiate adjustment of the operation of the two products 20 by initiating and running the APP on the tablet 52. The CPU 24 of the tablet 52 processes the APP, receives the instructions provided by the user via the touch screen 36, and emits one or more signals 48 to the first and second products 20. The first and second products 20 receive the signal(s) 48 via their receivers 44, the CPUs 24 on the first and second products 20 process the instructions sent via the signal(s) 48, and the output devices 40 of the first and second products 20 operate in a coordinated manner. In this example, the illuminated jacket 20 and illuminated wall structure 20 may illuminate in a coordinated manner such as, for example, illuminate as the same color, illuminate in complementary colors, illuminate in different but desired colors, flash or pulse simultaneously and at the same rate, flash or pulse in a complementary manner, flash or pulse differently from one another but in a desired manner, etc.

It should be understood that the communication device 52 and any software and/or APP that may be downloaded to a communication device 52 may enable the communication device 52 to communicate with any type of product 20 using any type of control language. It should also be understood that the downloadable software and/or APP may allow a user to create manners of operating products and the communication device 52 may operate products in accordance with the created operating manners. Further, it should be understood that the downloadable software and/or APP may already include predetermined manners of operating products and the communication device 52 may operate the products in the predetermined operating manners.

In another example and with reference to FIG. 7, another exemplary system may include a smartphone as the communication device 52 with Bluetooth capabilities, a sound system as a first product 20, a lighting fixture as a second product 20, an environmental control system as a third product 20, and a fog machine as a fourth product 20. The four products 20 in combination may be considered part of an entertainment system. The smartphone 52 may include similar components as the communication device 52 illustrated in FIG. 5. The smartphone 52 may also include a downloadable software program or application ("APP") stored thereon in the memory 28 that facilitates adjustment and coordination of the operation of the four products 20. The first, second, third and fourth products 20 may be similar to the products 20 illustrated in FIGS. 2 and 3 with each of the sound system 20, lighting fixture 20, environmental control system 20, and fog machine 20 including a receiver 44 to communicate with the communication device 52. The sound system 20 includes at least one speaker as an output device 40, the lighting fixture 20 includes at least one illumination device as the output device 40, the environmental control system 20 includes a heating or cooling device as the output device 40, and the fog machine 20 includes an exhaust for exhausting fog as the output device 40. The smartphone 52 may include a touch screen or a keypad as the input device 36 and a user may initiate adjustment of the operation of the four products 20 by initiating and running the APP on the smartphone 52. The CPU 24 of the smartphone 52 processes the APP, receives the instructions provided by the user via the touch screen or keypad 36, and emits one or more signals 48 to the four products 20. The four products 20 receive the signal(s) 48 via their receivers 44, the CPUs 24 on the four products 20 process the instructions sent via the signal(s) 48, and the output devices 40 of the four products 20 operate in a coordinated manner. In this example, the coordinated manner may be a wide variety of coordinated manners. For example, the coordinated manner may include the speaker 40 outputting a particular and desired audio, the illumination device 40 may illuminate a particular and desired color, the environmental control system 20 may establish the environment of a particular and desired temperature, and the fog machine 20 may emit fog at a desired time and in a desired amount. Many other manners of coordinating operation of the system are possible and are intended to be within the intended spirit and scope of the present invention.

In a further example, an exemplary system may include a tablet as the communication device 52, a shirt as the first product 20, and a pair of headphones as the second product 20. The tablet 52 may include similar components as the communication device 52 illustrated in FIG. 5. The tablet 52 may also include a downloadable software program or APP stored thereon in the memory 28 that facilitates adjustment and coordination of the operation of the first and second products 20. The shirt 20 and headphones 20 may be similar to one of the products 20 illustrated in FIGS. 2 and 3, and both the shirt 20 and headphones 20 include a receiver 44 to communicate with the communication device 52 and an illumination device as their output device 40. The tablet 52 may include a touch screen as the input device 36 and a user may initiate adjustment of the operation of the two products 20 by initiating and running the APP on the tablet 52. The CPU 24 of the tablet 52 processes the APP, receives the instructions provided by the user via the touch screen 36, and emits one or more signals 48 to the first and second products 20. The first and second products 20 receive the signal(s) 48 via their receivers 44, the CPUs 24 on the first and second products 20 process the instructions sent via the signal(s) 48, and the output devices 40 of the first and second products 20 operate in a coordinated manner. In this example, the illuminated shirt 20 and illuminated headphones 20 may illuminate in a coordinated manner such as, for example, illuminate as the same color, illuminate in complementary colors, illuminate in different but desired colors, flash or pulse simultaneously and at the same rate, flash or pulse in a complementary manner but not simultaneously, flash or pulse differently from one another but in a desired manner, etc.

In still another example, an exemplary system, similar to the previous example, includes a tablet as the communication device 52, a shirt as the first product 20, and a pair of headphones as the second product 20, except in this example the output devices 40 of the shirt and headphone are coatings that alter their characteristics when exposed to external conditions. The tablet 52 may include similar components as the communication device 52 illustrated in FIG. 5. The tablet 52 may also include a downloadable software program or APP stored thereon in the memory 28 that facilitates adjustment and coordination of the operation of the first and second products 20. The shirt 20 and headphones 20 may be similar to one of the products 20 illustrated in FIGS. 2 and 3, and both the shirt 20 and headphones 20 include a receiver 44 to communicate with the communication device 52 and an illumination device as their output device 40. The tablet 52 may include a touch screen as the input device 36 and a user may initiate adjustment of the operation of the two products 20 by initiating and running the APP on the tablet 52. The CPU 24 of the tablet 52 processes the APP, receives the instructions provided by the user via the touch screen 36, and emits one or more signals 48 to the first and second products 20. The first and second products 20 receive the signal(s) 48 via their receivers 44, the CPUs 24 on the first and second products 20 process the instructions sent via the signal(s) 48, and the coatings 40 of the first and second products 20 operate in a coordinated manner. In this example, a first level of current may be applied to the shirt 20 to provide the shirt 20 with a first color and a second level of current may be applied to the headphones 20 to provide the headphones with a second color. The first and second colors may be coordinated with each other.

As indicated above, any number of products 20 may be operated in a coordinated manner and such coordinated operation may be any type of operation. In some instances, software or APPS downloaded to the user's communication device 52 may already include a plurality of predetermined coordinated operations 64 for controlling operation of a plurality of products 20. In such instances, a user selects the desired predetermined coordinated operation 64 and the products 20 operate accordingly. In other instances, software or APPS downloaded to the user's communication device 52 provide a user with the ability to create their own coordinated operations 64 for controlling operation of a plurality of products 20. In such instances, a user creates one or more coordinated operations 64 on the communication device 52 with the APP and stores the created coordinated operation(s) 64 in the memory 28. The user may create any number of coordinated operations 64 and select the created coordinated operations 64 on the communication device 52 as desired.

Figure 8:
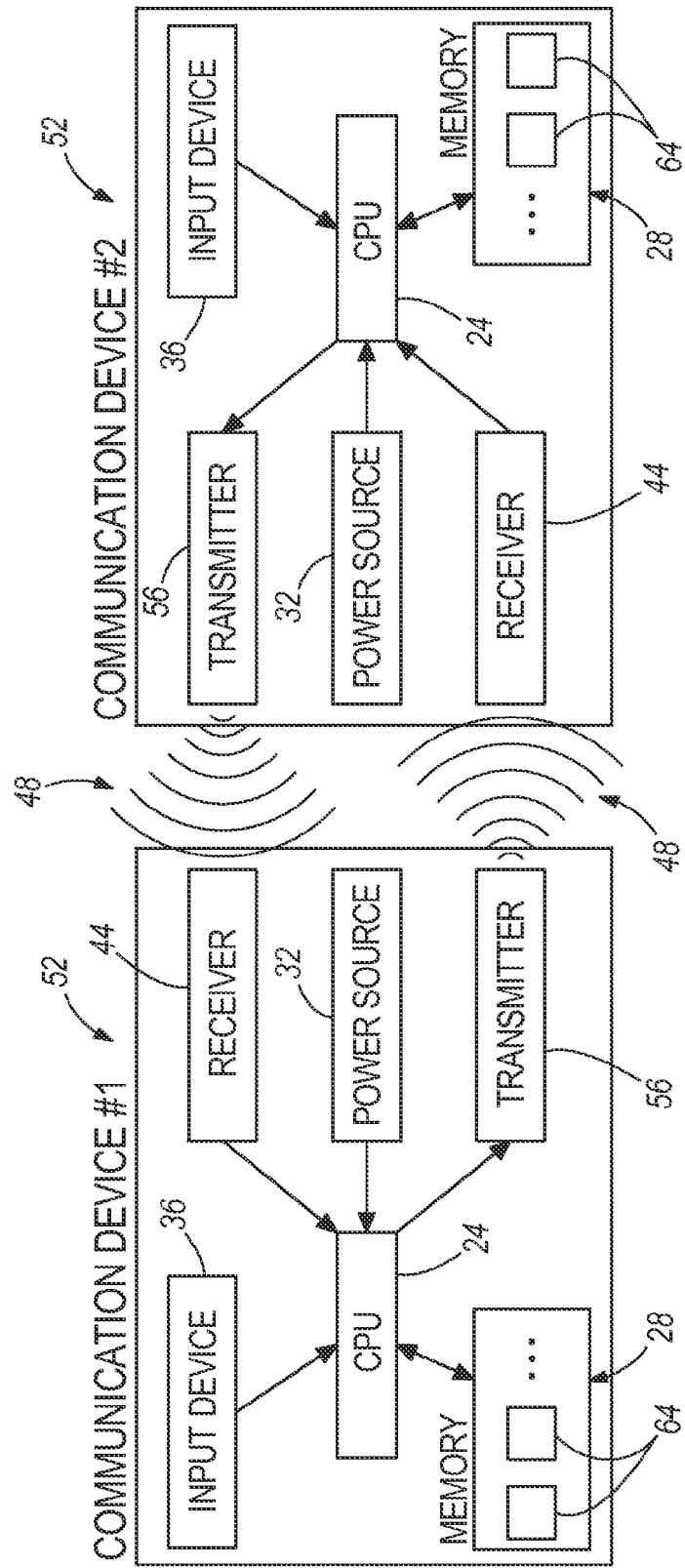
FIG. 8 is a diagram of still a further exemplary system including a plurality of exemplary communication devices.

Referring now to FIG. 8, a further exemplary system is illustrated and includes a plurality of communication devices 52. The illustrated exemplary embodiment illustrates a first communication device 52 and a second communication device 52. In this exemplary embodiment, the first and second communication devices 52 are capable of sharing coordinated operations 64 with one another. Whether the coordinated operations 64 are predetermined, downloaded and stored in the communication device 52, or created by a user and stored in the communication device 52, the coordinated operations 64 may be transferred from one communication device 52 to the other communication device 52 to provide both devices with the capability of operating products 20 in the same coordinated manner 64. Each communication device 52 includes, among other things, a transmitter 56 and a receiver 44.

The following is an exemplary process of transferring a coordinated operation 64 from one communication device 52 to another communication device 52. This process is provided for exemplary purposes to demonstrate the sharing concept and is not intended to be limiting. Coordinated operations 64 may be transferred between communication devices 52 in a variety of other processes and all of such processes are intended to be within the spirit and scope of the present invention. In some examples, the CPU 24 of a first communication device 52 communicates with the memory 28, identifies the desired coordinated operation 64 to be transferred, creates a signal 48 including data related to the selected coordinated operation 64, communicates with the transmitter 56, and transmits the signal 48 via the transmitter 56. A receiver 44 of a second communication device 52 receives the transmitted signal 48 and the CPU 24 of the second communication device 52 processes the signal 48. The CPU 24 also stores the coordinated operation 64 in the memory 28 of the second communication device 52 for future use. The second communication device 52 is now capable of operating products 20 in the same coordinated manner 64 as the first communication device 52. It should be understood that the system is capable of having any number of communication devices 52 and coordinated operations 64 may be transferred or shared between any number of communication devices 52.

Figure 9:
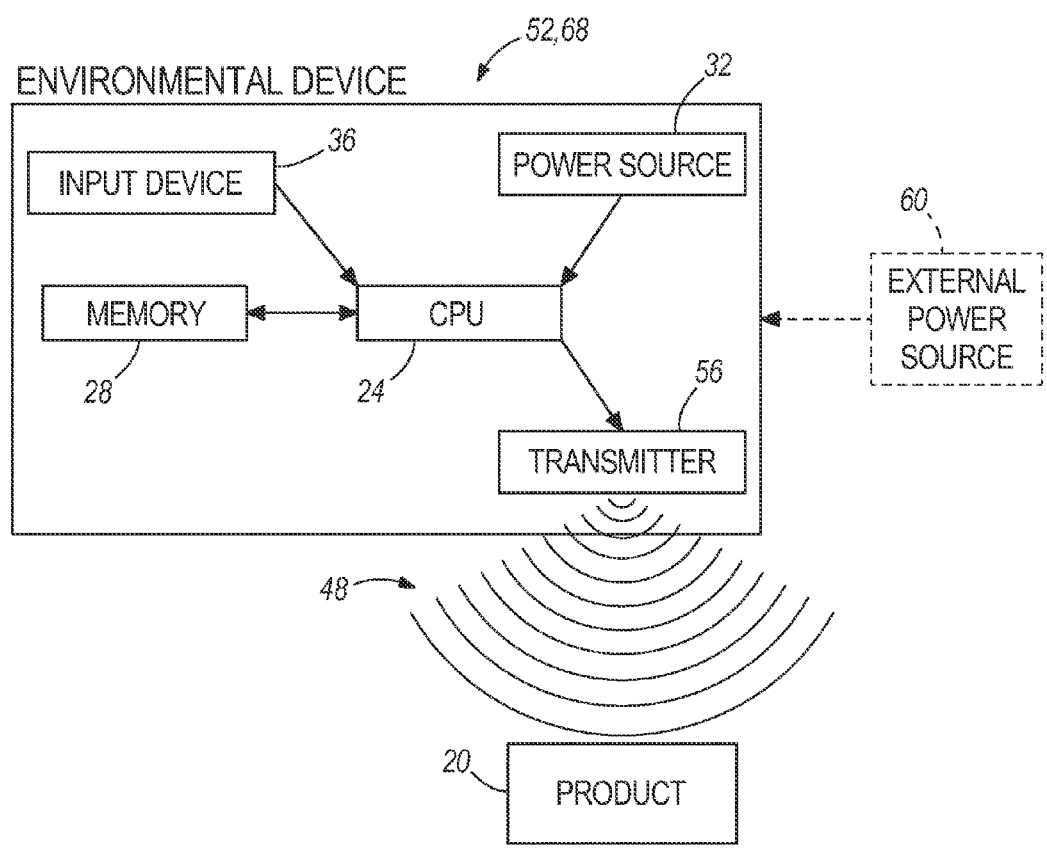
FIG. 9 is a diagram of yet another exemplary system including an exemplary environmental device and an exemplary product.

With reference now to FIG. 9, yet another exemplary system is illustrated and includes an exemplary environmental device 68 and an exemplary product 20. As described above, products 20 receive operating instructions from a user via a communication device 52 or an input device 36 on the product 20. In some exemplary embodiments, the communication device 52 may be an environmental device 68 located in an environment that, when activated or initiated, communicates with the product 20 to control operation of the product 20. Activation or initiation of the environmental device 68 may be performed by a user. The product 20 may be any of the types of products 20 described herein, alternatives thereof, or other products not described herein. An exemplary environmental device 68 may include a sensor as an input device 36. In such an exemplary instance, a user may enter a room and trip a motion sensor 36, apply pressure to a pressure sensor 36 (e.g., via a sensor in a floor panel), or activate any of a wide variety of other sensors 36 in a wide variety of other manners. Upon activation of a sensor 36, the CPU 24 receives an activation signal from the sensor 36, creates appropriate instructions based on the activation of the sensor 36, communicates with the transmitter 56, and transmits operating instructions to the product 20. It should be understood that this exemplary system may include a plurality of products 20 rather than just the single product 20 in the illustrated exemplary embodiment. In such systems including multiple products 20, the operating instructions transmitted by the environmental device 68 may be coordinated operations 64 or may not be coordinated.

Figure 10:
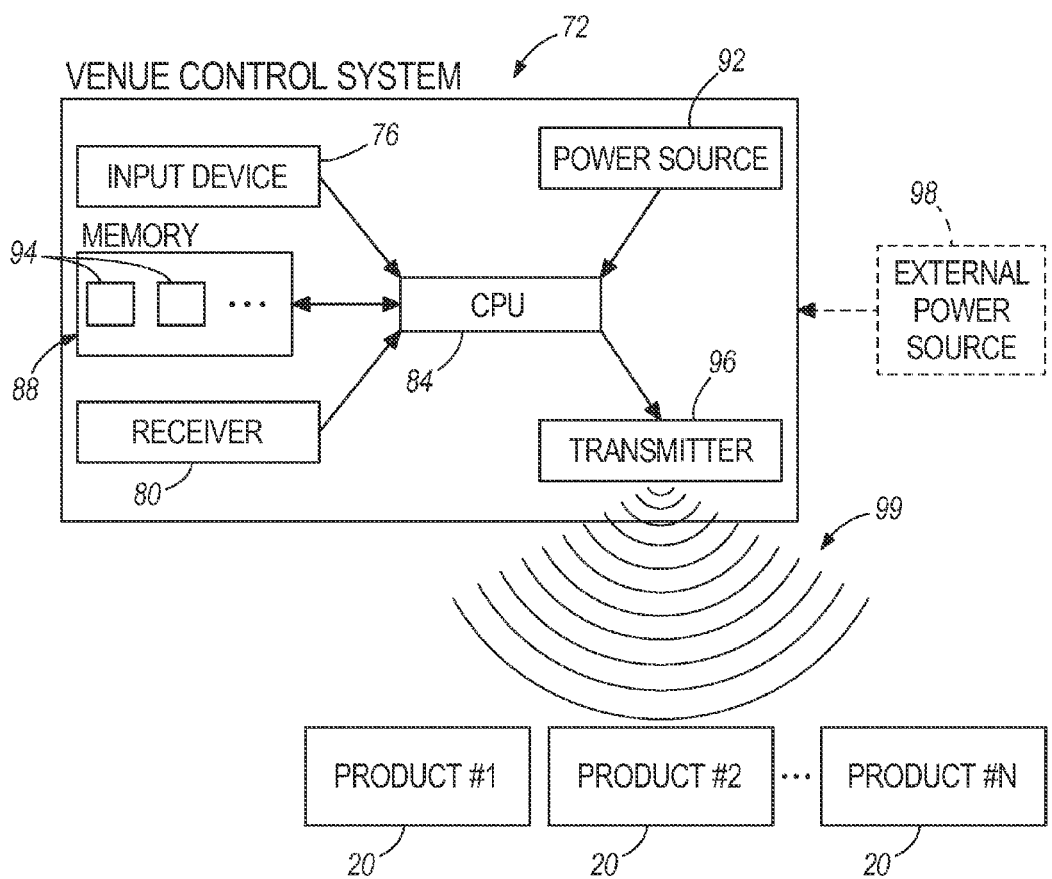
FIG. 10 is a diagram of yet a further exemplary system including a plurality of exemplary products and an exemplary venue control system.

Referring now to FIG. 10, yet a further exemplary system is illustrated and includes a third party control system or venue control system 72 and a plurality of exemplary products 20. The system provides a venue with the ability to adjust or alter operation of a plurality of products 20 within the venue and, more particularly, adjust or alter outputs of the products 20. Moreover, the system provides a venue with the ability to coordinate operation of a plurality of products 20 with respect to one another. The venue may be any type of venue and be within the spirit and scope of the present invention. Exemplary venues include, but are not limited to, music concerts, sporting events, restaurants, bars, anywhere else people gather in numbers, or any other venue. In this exemplary embodiment, the products 20 may be similar to the products 20 illustrated in FIGS. 2 and 3, and may be any of the exemplary types of products described above. Alternatively, the products 20 illustrated in FIG. 10 may be different than those products 20 illustrated in FIGS. 2 and 3 and described above as long as the products 20 include a receiver 44 for receiving signals 48 from a venue control system 72.

In this exemplary embodiment, the venue control system 72 may include an input device 76, a receiver 80, a CPU 84, memory 88, a power source 92, and a transmitter 96. The input device 76 may be any of the types of input devices described above, alternatives thereof, or other input devices not described herein but within the intended spirit and scope of the present invention. The input device 76 may be manipulated or a signal may be sent to the venue control system 72 and received by the receiver 80 in order to initiate a process for adjusting or altering operation of the products 20. The CPU 84 communicates with either or both of the input device 76 and the receiver 80 to receive the proper instructions. The CPU 84 communicates with the memory 88 as needed to achieve the desired operation of the system and receives the necessary power from the power source 92. The system may additionally include an external power source 98 such as, for example, an alternating current (AC) power source (e.g., a power cord coupled to an electrical wall outlet) if such a power source 98 is needed or when such a power source 98 is available. The CPU 84 communicates with the transmitter 96, which in turn transmits a signal 99 or a plurality of signals 99 including all the operating instructions for all the products 20. The products 20 receive their instructions from the signal or plurality of signals 99 and process the signal(s) 99. The venue control system 72 may alter or adjust the operation of the products 20 between any number of different operations and may make such adjustments as many times as desired.

In some exemplary embodiments, the venue control system 72 may control and adjust the products 20 individually and in an unrelated manner. That is, operation of the products 20 will not be coordinated or choreographed.

In other exemplary embodiments, the venue control system 72 may control and adjust the products 20 in a coordinated and choreographed manner. Operation of any number of products 20 may be coordinated or choreographed. Additionally, operation of the products 20 may be coordinated or choreographed in any manner. For example, a plurality of predetermined coordinated operations 94 for controlling operation of a plurality of products 20 may be stored in the memory 88 of the venue control system 72.

The following are exemplary systems, products, and exemplary processes of adjusting and/or coordinating operation of a plurality of exemplary products. None of the exemplary systems, products, or adjusting/coordinating processes are intended to be limiting. Rather, any systems, products and processes of adjusting/coordinating may be utilized and be within the intended spirit and scope of the present invention.

In one example, the venue may be a music concert and a plurality of products 20 may be available for purchase at the music concert or may have been purchased by the music concert attendees prior to the concert. Exemplary products 20 applicable to this exemplary embodiment may include, but are not limited to, headwear, apparel, buttons, glasses, drinking containers, etc., and each product 20 includes at least one output device 40 such as, for example, an illumination device, an audio device, a vibration device, a coating that alters its characteristics when exposed to external conditions, etc. The venue control system 72 is adapted to control operation of the products 20 in accordance with one or more of the coordinated operations 94 when the products 20 are at the venue. The coordinated operations 94 may include any type of output device control such as, for example, illumination flashing/pulsating, illumination intensity, illumination patterning, illumination color, audio intensity, vibration intensity, changing of coating color, etc. Exemplary coordinated operations may include, but are not limited to, pulsating the illumination devices or changing the coating colors on shirts or hats of the concert attendees in accordance with the music, illuminating or changing the coating colors on the shirts and/or hats of the concert attendees in the color or colors associated with the musical performer or associated with a theme of the music being played, or any other type of operation.

In another example, the venue may be a sporting event and a plurality of products 20 may be available for purchase at the sporting event or may have been purchased by sporting event attendees prior to the sporting event. Exemplary products 20 applicable to this exemplary embodiment may include, but are not limited to, headwear, apparel, buttons, glasses, drinking containers, etc., and each product 20 includes at least one output device 40 such as, for example, an illumination device, an audio device, a vibration device, a coating that alters its characteristics when exposed to external conditions, etc. The venue control system 72 is adapted to control operation of the products 20 in accordance with one or more of the coordinated operations 94 when the products 20 are at the venue.

The coordinated operations 94 may include any type of output device control such as, for example, illumination flashing/pulsating, illumination intensity, illumination patterning, illumination color, audio intensity, vibration intensity, changing coating colors, etc. Exemplary coordinated operations may include, but are not limited to, pulsating the illumination devices or changing the coating colors on shirts or hats of the sporting event attendees in unison with an activity occurring or just occurred at the sporting event (e.g., illuminating or changing the coating color on shirts or headwear red, white, and blue while the national anthem is played, flashing and illuminating or changing the coating color on shirts or headwear after a touchdown is scored at a football game, a basket is made at a basketball game, a homerun at a baseball game, etc.), illuminating or changing coating colors on the shirts and/or hats of the sporting event attendees in the color or colors associated with the sports team, or any other type of operation.

In a further example, the venue may be a bar or other drinking and/or dining establishment and a plurality of products 20 may be available for purchase at the bar or may have been purchased by clientele of the bar. Exemplary products 20 applicable to this exemplary embodiment may include, but are not limited to, headwear, apparel, buttons, glasses, drinking containers, etc., and each product 20 includes at least one output device 40 such as, for example, an illumination device, an audio device, a vibration device, a coating that changes its characteristics when exposed to external conditions, etc. The venue control system 72 is adapted to control operation of the products 20 in accordance with one or more of the coordinated operations 94 when the products 20 are at the venue. The coordinated operations 94 may include any type of output device control such as, for example, illumination flashing/pulsating, illumination intensity, illumination patterning, illumination color, audio intensity, vibration intensity, changing coating color, etc. Exemplary coordinated operations may include, but are not limited to, illuminating or changing coating colors on shirts and/or headwear of the bar clientele in accordance with the colors of a college team, in accordance with their relationship status (e.g., single, dating, married, "it's complicated", etc.), in accordance with the music being played at the bar, etc.

Many other types of venues and coordinated operations by a venue control system are possible and are intended to be within the spirit and scope of the present invention.

Figure 11:
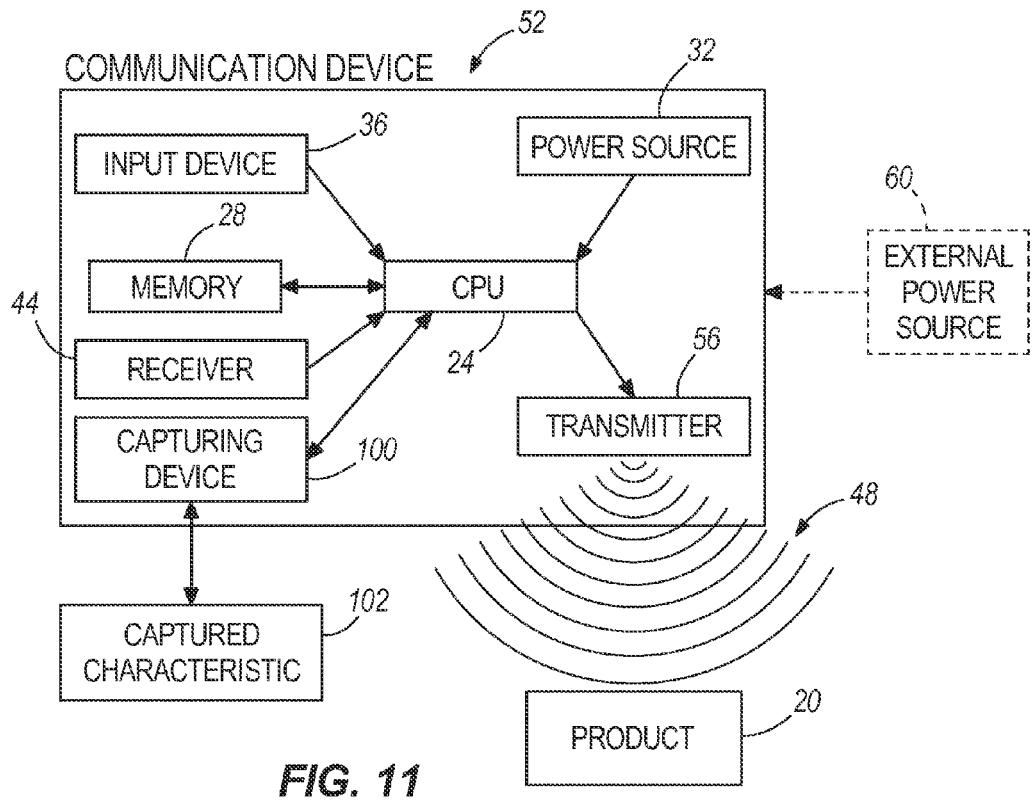
FIG. 11 is a diagram of another exemplary system including an exemplary characteristic capturing device.

Referring now to FIG. 11, another exemplary system is illustrated and may have some similarities in structure and function to the exemplary system illustrated in FIG. 4 and described above. The structure in common is identified with the same reference number and the system illustrated in FIG. 11 is capable of performing all the functionality described above in connection with the exemplary system illustrated in FIG. 4, alternatives thereof, and additional functionality. With particular reference to the FIG. 11, the exemplary system includes a capturing device 100 adapted to capture a characteristic 102 of an object. The captured characteristic 102 may be a wide variety of characteristics such as, for example, color, motion, flashing or pulsating of illumination devices, patterns, or any other of a wide variety of object characteristics. The capturing device 100 may be a wide variety of devices adapted to capture characteristics of objects such as, for example, a camera, an optical character recognition device, or any other device adapted to capture characteristics of an object. Such characteristic capturing devices 100 may stand alone or may be included in other devices such as, for example, a cellular phone, smartphone, tablet, personal computer, laptop, etc. After the capturing device 100 captures the characteristic, the capturing device 100 communicates with the CPU 24. The CPU 24 receives data associated with the captured characteristic 102 and communicates with the transmitter 56. The transmitter 56 transmits a signal 48 to the product 20 and the product 20 operates in a manner associated with the captured characteristic 102. For example, the capturing device 100 may capture a color 102 of an object, communicate data associated with the color to the CPU 24, the CPU 24 may communicate with the transmitter 56, and the transmitter 56 may transmit a signal 48 to the product 20 associated with the captured color 102 in order to illuminate the illumination device(s) 40 or change the color of the coating(s) 40 of the product 20 with the same color as the captured color. Also, for example, a similar process may be utilized to capture a different characteristic such as flashing or pulsating illumination device(s) 102 and operate the illumination device(s) 40 or the coatings 40 of the product 20 in the same flashing or pulsating manner as the captured characteristic.

It should be understood that while the above exemplary embodiments include various types of wireless communication, the present invention may include wired communication rather than the wireless communication described above and illustrated in the drawings. Moreover, it should be understood that the present invention may include any combination of wireless and wired communications.

Figure 12:
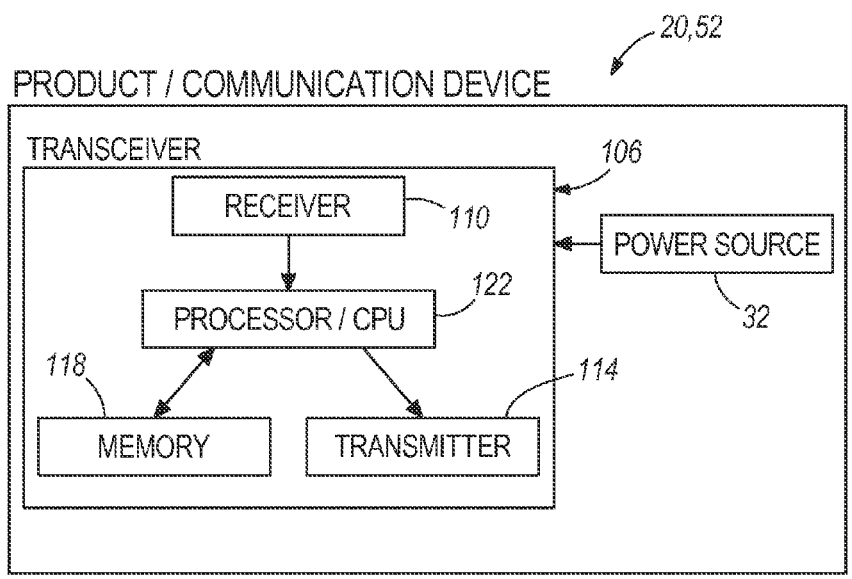
FIG. 12 is a diagram of an exemplary product or communication device including an exemplary transceiver.

It should also be understood that the above description relating to transmitters and receivers is not intended to be limiting. Rather, other devices are capable of performing the necessary functionality to facilitate communication between devices. For example, a transceiver may be used in place of a receiver and a transmitter. In such an example, the transceiver may perform one or more of interpreting signals, translating signals, receiving signals, transmitting signals, and may include memory and a processor/CPU. In instances where the transceiver may include memory and/or a processor/CPU, the memory and processor/CPU may replace the memory and CPU in the exemplary systems. Such transceivers may be uniquely designed both in structure and functionality and incorporated into any of the exemplary systems of the present invention. Referring to FIG. 12, an exemplary product or communication device including an exemplary transceiver 106 is illustrated. This illustrated exemplary transceiver 106 is not intended to be limiting, but rather serve as an exemplary possibility of the many types of transceivers 106 contemplated for the present invention. The exemplary transceiver 106 may be included in either or both a product 20 and/or a communication device 52. The transceiver 106 may include any number of a receiver 110, a transmitter 114, memory 118, a processor or CPU 122, and any of wide variety of other elements. The transceiver 106 may be in electrical communication with the power source 32 of the product 20 and/or the communication device 52. While not illustrated, the exemplary product 20 and/or communication device 52 may include any of the other structural elements described above in connection with the product 20 and/or communication device 52. Such other structural elements have been omitted for simplicity of emphasizing the exemplary transceiver. Similarly, the exemplary product 20 and/or communication device 52 may have the same functionality of the products 20 and/or communication devices 52 described above or alternative functionality thereof.

Figure 13:
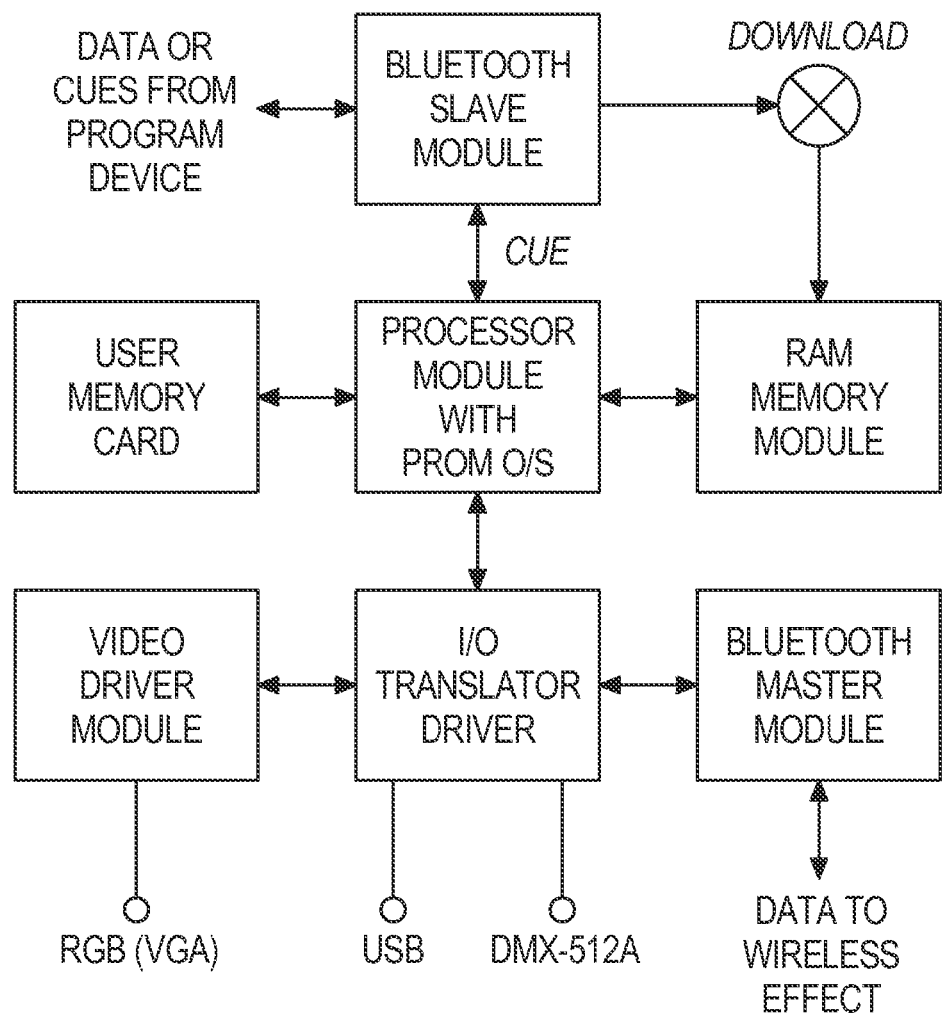
FIG. 13 is a diagram of an exemplary transceiver and exemplary elements and functionality associated with the exemplary transceiver.

With reference to FIG. 13, an exemplary diagram of an exemplary transceiver, associated elements, and associated functionality is illustrated. This exemplary diagram is for illustrative purposes only and is not intended to be limiting upon the present invention. Rather, many other diagrams, associated elements, and associated functionality are possible and are intended to be within the spirit and scope of the present invention. In some exemplary embodiments, a transceiver may be a primary system controller employing an embedded processor. The transceiver may receive information from a communication device and operate one or more products in accordance with the received information. Data and routines may be stored in the transceiver to permit relatively fast action without worrying about potential slow speeds sometimes associated with wireless connection. The transceiver may also receive downloadable material such as, for example, routines and cues to take action. Outputs from a transceiver may pass through firmware interpreters and produce DMX-512A and Red-Green-Blue (RGB) outputs. The transceiver may also include a USB port or bus for generic I/O capability and a slot or receptacle for receiving a portable memory device such as, for example, a data card or flash drive. The transceiver may also control a number of effects simultaneously. For example, a single transceiver may control a hat, shirt, pants and shoes all containing output devices, such as illumination devices, with a wireless connection to the shoes and hat, and wired connections to the shirt and pants.

Figure 14:
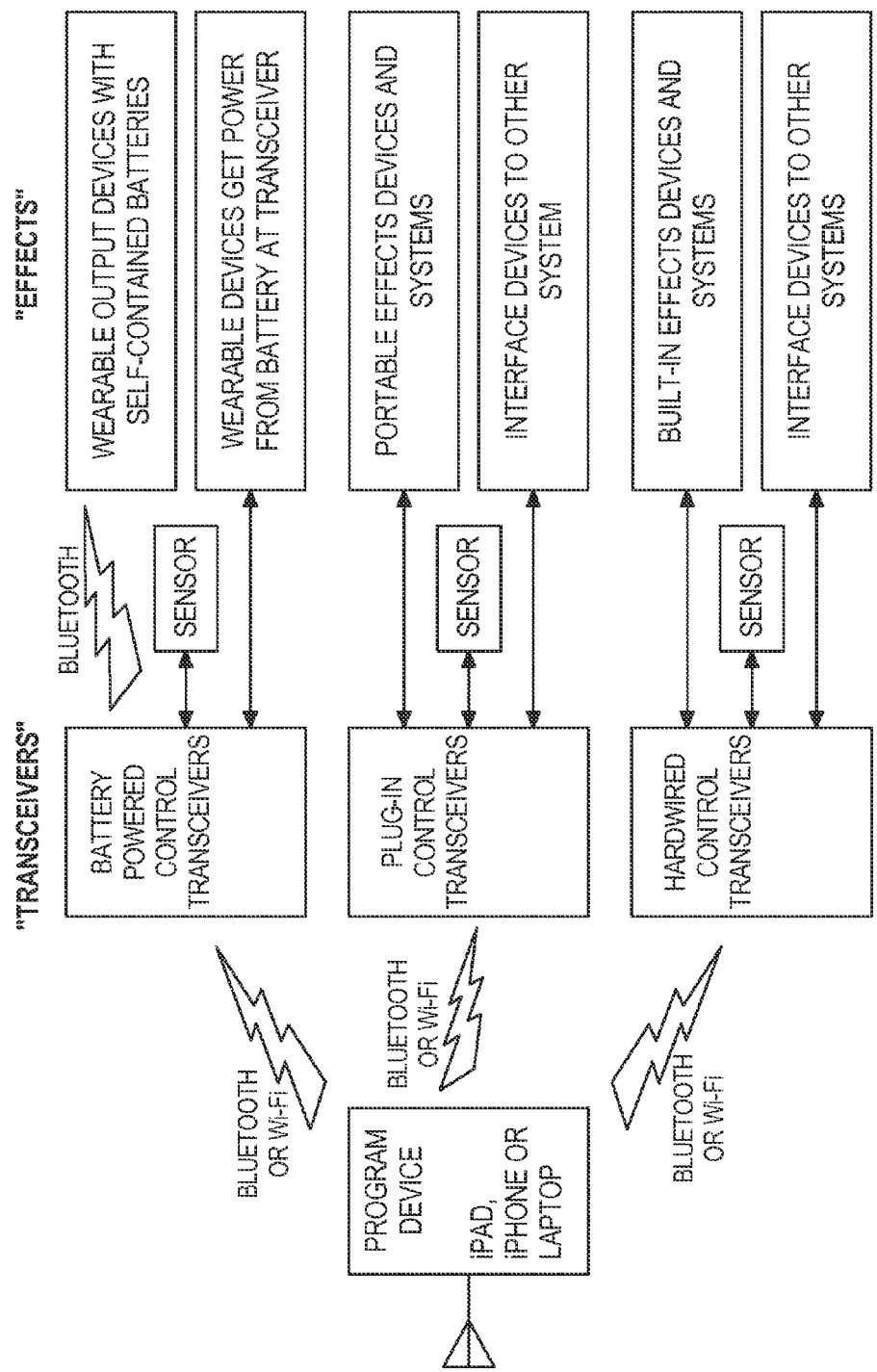
FIG. 14 is still another exemplary system of the present invention.

Referring now to FIG. 14, another exemplary system is illustrated and includes some of the same structure and functionality as other exemplary systems described herein and also includes different structure and functionality. In this illustrated embodiment, the system includes a portable memory device adapted to have data stored thereon that may be inserted into or otherwise electrically coupled to one or more of products, communication devices, transceivers, etc., in order to transfer data to one or more of the products, communication devices, transceivers, etc. The portable memory device may be a wide variety of different types of devices such as, for example, a SanDisk memory card, a thumb drive, a flash drive, a CD, a micro memory card, or any other type of portable memory device. In some exemplary embodiments, the portable memory device may include data associated with predetermined operating manners or predetermined coordinated operations for controlling operation of a one or more products. Such a portable memory device is also represented in FIG. 13 in the block entitled "User Memory Card". Such data may be loaded onto the portable memory device by users or may be loaded on the portable memory devices by retailers. With respect to users, a user may download, create, or otherwise obtain data associated with operations and store such data on the portable memory device. With respect to retailers, each retailer can create product operations associated with the retailer, store the product operations on a portable memory device, and sell the portable memory devices with predetermined product operations associated with the retailer. For example, DISNEY® may create and sell a portable memory device with a princess themed product operation that, when coupled to a product, the product may illuminate and/or play music associated with princesses. Also, for example, a sporting team may create and sell a portable memory device containing product operation associated with the sporting team. Such product operation may relate to illumination and/or sound associated with the sporting team. In any exemplary embodiment containing a portable memory device, a user may simply purchase the themed portable memory device, couple the portable memory device to an appropriate product, and the product operates in accordance with the themed predetermined product operations stored on the portable memory device.

As an alternative to portable memory devices, in other exemplary embodiments, predetermined and/or choreographed product operations may be communicated to the products in an on-line consumer environment such as, for example, in an iTunes® environment. Users may purchase product operations on-line and communicate the purchased product operations to the products in order to operate the products in accordance with the purchased product operations.

With continued reference to FIG. 14, the exemplary system also includes a plurality of different types of transceivers such as, for example, a battery powered control transceiver, a plug-in control transceiver, and a hardwired control transceiver. Other types of transceivers are contemplated and are intended to be within the spirit and scope of the present invention. The exemplary system also includes sensors adapted to sense an environmental condition or action and communicate with the transceivers to initiate or alter product operation.

In the exemplary system illustrated in FIG. 14, the system may include specific hardware transceivers, of which there may be separate transceivers for "worn" components or products, fixed components or products, and portable components or products. Each transceiver may be a programmable controller that receives and decodes instructions from system software, which may be used to perform the necessary functionality of the system. The transceivers may store the instructions in memory and execute the instructions upon receipt of cues. Cues may be sent from a communication device or from an environmental device such as a sensor. For example, a motion sensor in the system may cue all components in the system to execute a particular operation. System transceivers may utilize Bluetooth and/or TCP/IP (wired or wireless) to communicate with other components in the system. In some exemplary embodiments, the products of the system may each include an embedded controller and port such as, for example, a DMX-512A, which is a simplex data system available in both wired and wireless versions.

With reference to FIG. 15, an exemplary operation of the exemplary illustrated system will be described herein. This exemplary operation is not intended to be limiting upon the present invention. Rather, the exemplary system is capable of operating in many different manners, all of which are intended to be within the spirit and scope of the present invention. The program device may be connected to a network such as the Internet and various versions of system software may be downloaded from a product website to the program device at any time. The system software may allow a user to program and save "moods" or predetermined operation of products which may be specific, coordinated configurations of routines operating simultaneously on all control transceivers. Basic to complex moods may be downloaded to the program device from the website. The programming device may be the primary programming and initiating device. In some examples, the downloadable software may be an APP that may: employ a unique user interface optimized for controlling a complex mood; detect and accept new transceivers, determines their programmability features, patches them into effect compatibility, and creates and sends routines to the transceivers to execute when commanded; aid the transceivers in setting up effects products; send scene change cues to the transceivers; and receive signals from the transceivers and respond. The program device and the transceivers may communicate via Bluetooth or in other manners such as the Internet or a cellular network.

With continued reference to FIG. 15 and additional reference to FIG. 14, transceivers may receive signals, act upon commands, and send signals back to the program device. Executable routines may be downloaded to the memory of the transceiver(s) and such routines may include, but are not limited to, color, pattern, brightness, or other programmable outputs or effects. Transceivers may execute and change routines when the program device sends cues. Also, transceiver inputs may cause upstream signals to the programming device such as motion sensor response. Battery transceivers may be optimized for wearable devices and may include a rechargeable battery pack, processor, control translator, and wiring harness. The battery transceivers may be Bluetooth enabled to communicate with remote products (e.g., shoes, hats, etc.), which themselves include self-contained batteries. The translator may convert system signals to the particular control of the pieces such as RGB or DMX512A, which may be wired and receive their power from the transceiver battery pack. A sensor may be plugged-in to send upstream inputs such as, for example, motion. Plug-in transceivers may be similar to other transceivers described herein, but may be optimized for fixed low power devices such as LED lights in furniture and LED or OLED light panels. Hardwired transceivers may be similar to other transceivers described herein, but may be optimized for fixed high power devices such as lighting system dimmers and large-scale wall displays. A portable memory device may be plugged into any transceiver and may contain pre-determined, choreographed, and/or custom routines specially suited for determining operation of products. Sensors may be plugged into the transceivers and may be programmed to cause a direct response in the transceiver (e.g., turn a light on) or send a signal to the program device to cue a system wide response.

The various systems, apparatuses, products, etc. disclosed herein and the features and functionality of such systems, apparatuses, products, etc. may be combined with any of the other systems, apparatuses, products, etc. in any combination and in any manner.

It should be understood that various exemplary types of output devices and functionality of output devices of products are described herein and such exemplary output devices and associated functionality are not intended to be limiting. Rather, the products and output devices associated with the present invention are adapted to be controlled in any manner resulting in any type of effect being performed by the products. Effects may include, but are not limited to, lighting; audio; coating color alteration; scent; vibration, and temperature; altering intensity of lighting, audio, color, scent, vibration, and temperature; flashing or pulsating lighting, audio, coating color, scent, vibration, and temperature; altering flashing or pulsating of lighting, audio, coating color, scent, vibration, and temperature; moving images or video on products; scrolling text on products; choreographing or coordinating output devices no matter the structure and functionality of the output devices; or any other of a wide variety of effects.

The foregoing description has been presented for purposes of illustration and description, and is not intended to be exhaustive or to limit the invention to the precise form disclosed. The descriptions were selected to explain the principles of the invention and their practical application to enable others skilled in the art to utilize the invention in various embodiments and various modifications as are suited to the particular use contemplated. Although particular constructions of the present invention have been shown and described, other alternative constructions will be apparent to those skilled in the art and are within the intended scope of the present invention.

What is claimed is:
1. An apparatus comprising:
   an input device manually manipulatable to change the input device between a first input condition and a second input condition;

a coating adapted to be a first color with the input device in the first input condition and a second color with the input device in the second input condition, wherein the first color is different than the second color; and a power source adapted to supply a first level of current to the coating with the input device in the first input condition and a second level of current to the coating with the input device in the second input condition, wherein the first level of current is different than the second level of current.

2. The apparatus of claim 1, wherein the input device is a mechanical actuator and is manually moveable between the first input condition and the second input condition.

3. The apparatus of claim 1, wherein the input device is one of a switch, actuator, dial, and keypad manually manipulatable between the first input condition and the second input condition.

4. The apparatus of claim 1, wherein the apparatus is one of a wearable apparatus, a watch, headwear, jewelry, footwear, a belt, a piece of furniture, an appliance, an electronic device, and a structural material.

5. The apparatus of claim 1, wherein the input device is a sensor and the sensor is adapted to be activated to change between the first input condition and the second input condition.

6. The apparatus of claim 1, wherein the coating is a first coating, the apparatus further comprising a second coating, and wherein the first and second coatings are controlled in a coordinated manner.

7. An apparatus comprising:
 a receiver;
 a coating adapted to change between a first color and a second color different than the first color;
 a power source adapted to supply the coating with a first level of current and a second level of current, wherein the coating has the first color when supplied with the first level of current and has the second color when supplied with the second level of current; and
 a processor in communication with the receiver, the power source, and the coating;
 wherein the receiver is adapted to receive a signal and communicate the signal to the processor, and wherein the processor is configured to have the power source supply the coating with one of the first level of current and the second level of current based on the signal received by the receiver.

8. The apparatus of claim 7, wherein the receiver is adapted to receive a plurality of signals and communicate the signals to the processor, and wherein the processor is configured to have the power source supply the first level of current to the coating based on a first signal of the plurality of signals and have the power source supply the second level of current to the coating based on a second signal of the plurality of signals.

9. The apparatus of claim 7, wherein the receiver receives the signal from a sensor and the sensor is activatable to communicate the signal to the receiver.

10. The apparatus of claim 7, wherein the apparatus is one of a wearable apparatus, a watch, headwear, jewelry, footwear, a belt, a piece of furniture, an appliance, an electronic device, and a structural material.

11. The apparatus of claim 7, wherein the coating is a first coating, the apparatus further comprising a second coating, and wherein the first and second coatings are controlled in a coordinated manner.

12. The apparatus of claim 11, wherein the apparatus receives the signal from a communication device including a processor and a transmitter, wherein the communication device is adapted to communicate with the apparatus to control the first and second coatings in the coordinated manner.

13. The apparatus of claim 12, wherein the communication device is one of a cellular phone, a smart phone, a tablet, a personal computer, a laptop computer, and an interactive entertainment device.

14. The apparatus of claim 7, wherein the apparatus receives the signal from a communication device including a processor and a transmitter, wherein the communication device is adapted to communicate with the apparatus to control the coating.

15. The apparatus of claim 14, wherein the communication device is one of a cellular phone, a smart phone, a tablet, a personal computer, a laptop computer, and an interactive entertainment device.

16. A system comprising:
 a first apparatus including
  a first receiver,
  a first power source,
  a first coating adapted to change color based on a level of current supplied to the first coating from the first power source, and
  a first processor in communication with the first receiver, the first power source, and the first coating;
 a second apparatus including
  a second receiver,
  a second power source,
  a second coating adapted to change color based on a level of current supplied to the second coating from the second power source, and
  a second processor in communication with the second receiver, the second power source, and the second coating; and
 a communication device including a processor and a transmitter, wherein the communication device is adapted to communicate with the first apparatus and the second apparatus to control the first coating and the second coating in a coordinated manner.

17. The system of claim 16, wherein the coordinated manner includes one of providing the first coating and the second coating in the same color, similarly altering color of the first coating and the second coating, providing the first coating and the second coating in complementary colors, and providing the first coating and the second coating to form a pattern.

18. The system of claim 16, wherein the first and second apparatuses are wearable.

19. The system of claim 16, wherein the communication device is one of a cellular phone, a smart phone, a tablet, a personal computer, a laptop computer, and an interactive entertainment device.

20. The system of claim 16, wherein the communication device wirelessly communicates with the first apparatus and the second apparatus.

21. The system of claim 16, wherein the communication device communicates with the first and second apparatuses through a wired connection.

22. A system comprising:
 an apparatus including
  a receiver,
  a power source,
  a coating adapted to change color based on a level of current applied to the coating by the power source, and
  a processor in communication with the receiver, the power source, and the coating; and a venue communication device including a processor and a transmitter and adapted to communicate with the apparatus to change a color of the coating, wherein the venue communication device has a limited range of communication associated with a venue and communicates with the apparatus to change the color of the coating with the apparatus within the limited range of communication.

23. The system of claim 22, wherein the venue communication device wirelessly communicates with the apparatus.

24. The system of claim 22, wherein the apparatus is one of a wearable apparatus, a watch, headwear, jewelry, footwear, a belt, an electronic device, a wireless communication device, and a drinking container.

25. The system of claim 22, wherein the apparatus is one of a cellular phone, a smart phone, and a tablet.

26. The system of claim 22, wherein the venue communication device is adapted to communicate with the apparatus to perform at least one of changing a color of the coating, changing a color intensity of the coating, and pulsating the color of the coating with the apparatus within the limited range of communication.

27. The system of claim 22, wherein the apparatus is a first apparatus, the receiver is a first receiver, the power source is a first power source, the coating is a first coating, and the processor is a first processor, the system further comprising a second apparatus including
a second receiver,
a second power source,
a second coating adapted to change color based on a level of current supplied to the second coating by the second power source, and
a second processor in communication with the second receiver, the second power source, and the second coating; and
wherein the venue communication device is adapted to communicate with the second apparatus to change a color of the second coating with the second apparatus within the limited range of communication.

28. The system of claim 27, wherein the venue communication device controls the first and second coatings in a coordinated manner.

29. The system of claim 27, wherein the venue communication device wirelessly communicates with the first apparatus and the second apparatus.

30. The system of claim 27, wherein the first and second apparatuses are wearable.

31. A system comprising:
a communication device including
a power source,
a transmitter,
a capturing device, and
a processor in communication with the transmitter, the power source, and the capturing device, wherein the capturing device is adapted to capture a color of an object and transmit data associated with the captured color; and
an apparatus including
a receiver,
an apparatus power source,
a coating adapted to change color based on a level of current supplied by the apparatus power source, and
a processor in communication with the receiver, the apparatus power source, and the coating, wherein the receiver is configured to receive the data transmitted by the communication device and the processor is configured to have the apparatus supply a level of current to the coating such that the coating is the same color as the captured color associated with the object.

* * * * *